United States Patent
Mueller

(10) Patent No.: US 11,313,455 B2
(45) Date of Patent: Apr. 26, 2022

(54) AIRCRAFT GEARBOX LUBRICATION SYSTEM WITH MULTIPLE LUBRICATION SUBSYSTEMS

(71) Applicant: Bell Helicopter Textron Inc., Fort Worth, TX (US)

(72) Inventor: Russell L. Mueller, Coppell, TX (US)

(73) Assignee: Textron Innovations Inc., Fort Worth, TX (US)

( * ) Notice: Subject to any disclaimer, the term of this patent is extended or adjusted under 35 U.S.C. 154(b) by 655 days.

(21) Appl. No.: 16/152,975

(22) Filed: Oct. 5, 2018

(65) Prior Publication Data

US 2020/0109777 A1 Apr. 9, 2020

(51) Int. Cl.
 *F16H 57/04* (2010.01)
 *B64D 35/00* (2006.01)
 *B64C 27/14* (2006.01)

(52) U.S. Cl.
 CPC ......... *F16H 57/0445* (2013.01); *B64C 27/14* (2013.01); *B64D 35/00* (2013.01); *F16H 57/0441* (2013.01); *F16H 57/0457* (2013.01)

(58) Field of Classification Search
 CPC .............. F16H 57/0445; F16H 57/045; F16H 57/0453; F16H 57/0454; F16H 57/0457; F16H 57/0465; F16H 2057/02039; F16N 7/26; F16N 7/28; F16N 7/40; B64C 27/14
 See application file for complete search history.

(56) References Cited

U.S. PATENT DOCUMENTS

| | | | |
|---|---|---|---|
| 4,829,850 A | 5/1989 | Soloy | |
| 5,791,592 A * | 8/1998 | Nolan | B64C 27/14 244/17.11 |
| 6,446,755 B1 * | 9/2002 | Varailhon | B64C 27/14 184/11.2 |

(Continued)

FOREIGN PATENT DOCUMENTS

EP 3633240 B1 11/2020

OTHER PUBLICATIONS

EPO Examination Report issue in EP Patent Application No. 18210657.5 dated Jan. 28, 2020, 4 pages.

(Continued)

*Primary Examiner* — Minh Truong
(74) *Attorney, Agent, or Firm* — Patent Capital Group

(57) ABSTRACT

In some examples, an aircraft gearbox comprises a housing, a barrier, a rotatable drive system component, a set of gears, and a lubrication system. The barrier separates a first compartment and a second compartment within the housing. Each of the rotatable drive system component and the set of gears operable to rotate based on torque received from an engine. The rotatable drive system component is located in the first compartment. The set of gears is located in the second compartment. The lubrication system comprises a first lubrication subsystem and a second lubrication subsystem, which are, at least in part, independent from one another. The first lubrication subsystem is operable to lubricate the rotatable drive system component in the first compartment. The second lubrication subsystem is operable to lubricate the set of gears in the second compartment. The barrier inhibits lubricant from passing between the first compartment and the second compartment.

9 Claims, 20 Drawing Sheets

(56) References Cited

U.S. PATENT DOCUMENTS

| | | | |
|---|---|---|---|
| 7,137,590 B2* | 11/2006 | Sandrart | B64C 27/12 |
| | | | 244/17.25 |
| 7,866,444 B2* | 1/2011 | Aldridge | F16N 7/26 |
| | | | 184/6.18 |
| 10,697,586 B2* | 6/2020 | Poster | F16C 33/6659 |
| 2012/0141270 A1* | 6/2012 | Minadeo | F03D 80/70 |
| | | | 416/1 |
| 2013/0098180 A1* | 4/2013 | Erhard | F16H 57/0495 |
| | | | 74/15.82 |
| 2014/0030110 A1* | 1/2014 | Sinusas | F16H 57/0471 |
| | | | 416/243 |
| 2015/0048213 A1 | 2/2015 | Ross et al. | |
| 2015/0048214 A1 | 2/2015 | Bockmiller et al. | |
| 2015/0284074 A1 | 10/2015 | Honnorat | |
| 2016/0369887 A1* | 12/2016 | Sheridan | F16H 57/045 |
| 2017/0370523 A1* | 12/2017 | Lasorso | F16N 7/22 |
| 2018/0086444 A1 | 3/2018 | Poster et al. | |
| 2018/0259060 A1 | 9/2018 | Poster et al. | |

OTHER PUBLICATIONS

EPO Examination Report issue in EP Patent Application No. 18210657.5 dated Jul. 5, 2019, 8 pages.

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

Perry, Dominic, "ANALYSIS: Bell 525 Relentless Cutaway and Technical Description", Flight Global, Flight International, Bell Helicopter, Published Nov. 12, 2014. (8 pages).

EPO Search Report issue in EP Patent Application No. 18210657.5 dated Jun. 12, 2019, 4 pages.

EPO Examination Report issued in EP Patent Application No. 18210657.5 dated Nov. 4, 2019, 7 pages.

* cited by examiner

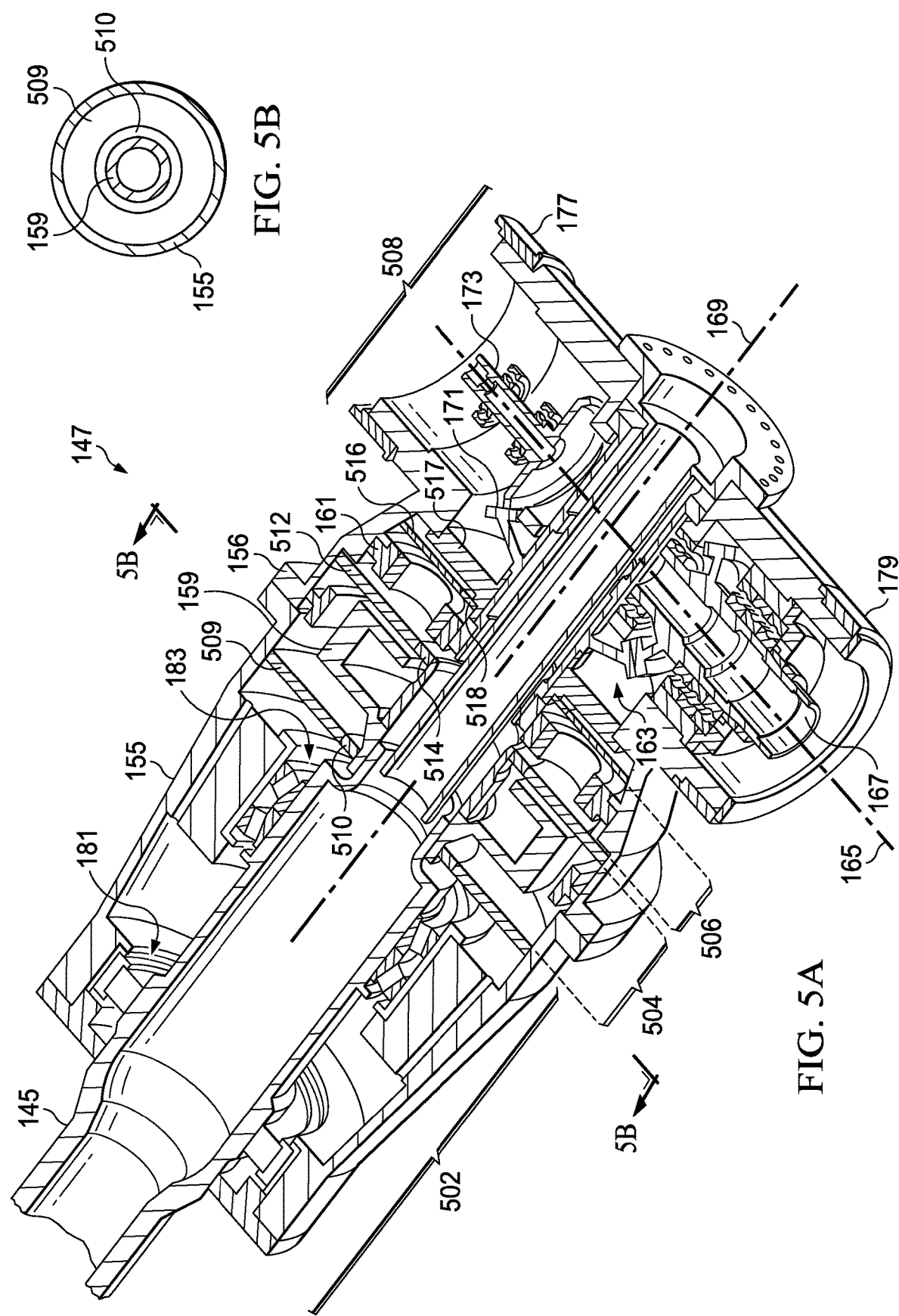

AIRCRAFT GEARBOX LUBRICATION SYSTEM WITH MULTIPLE LUBRICATION SUBSYSTEMS

TECHNICAL FIELD

This disclosure relates generally to aircraft drive systems, and more particularly, though not exclusively, to systems and apparatuses for lubricating a drive system component in an aircraft drive system.

BACKGROUND

Aircraft include many components and systems that are powered by an engine. For example, an engine provides power to systems, such as a rotor system, through a drive system. The drive system includes, e.g., gear boxes, masts, driveshafts, bearings, and gears which transfer torque from the engine to the components. For a rotor system, the drive system can include a gear box located between the engine and rotors in the rotor system. The gearbox transmits to power to a mast that, in turn, powers the rotors. The gear box may be lubricated by a lubrication system. The lubrication helps protect components of the gear box from wear and facilitates movement of the components so that they effectively transfer torque. In some drive systems, the components may rotate at thousands of revolutions per minute (RPM) during operation and generate heat. The lubrication system can transfer heat from the drive system and cool the components. For example, a pressurized lubrication system can use pressure to spread a lubricant on the drive system. When properly functioning, the lubrication system can reduce the likelihood of the drive system losing torque, failing, and/or overheating. The drive system is more susceptible to losing torque, failing (in whole or in part), and/or overheating when the lubrication system is malfunctioning and/or not functioning at all. Thus, maintaining a properly functioning lubrication system is critical to the safety service life of the aircraft.

SUMMARY

In some examples, a gearbox comprises a housing, a barrier, a rotatable drive system component, a set of gears, and a lubrication system. The barrier separates a first compartment and a second compartment within the housing. Each of the rotatable drive system component and the set of gears operable to rotate based on torque received from an engine. The rotatable drive system component is located in the first compartment. The set of gears is located in the second compartment. The lubrication system comprises a first lubrication subsystem and a second lubrication subsystem, which are, at least in part, independent from one another. The first lubrication subsystem is operable to lubricate the rotatable drive system component in the first compartment. The second lubrication subsystem is operable to lubricate the set of gears in the second compartment. The barrier inhibits lubricant from passing between the first compartment and the second compartment.

In other examples, an aircraft comprises an engine, a set of gears, a driveshaft assembly, and a gearbox. The set of gears is operable to rotate based on torque received from the engine. The driveshaft assembly is operable to receive torque from the set of gears. The gearbox comprises a housing, a barrier, and a lubrication system. The barrier separates a first compartment and a second compartment within the housing. The first compartment encloses a portion of the driveshaft assembly and the set of gears is located in the second compartment. The lubrication system comprises a first lubrication system and a second lubrication system, which are, at least in part, independent from one another. The first lubrication system is operable to lubricate the portion of the driveshaft assembly in the first compartment. The second lubrication system is operable to lubricate the set of gears in the second compartment. The barrier inhibits lubricant from passing between the first compartment and the second compartment.

In still other examples, a method includes providing an aircraft gearbox comprising a housing and a barrier separating a first compartment and a second compartment within the housing, wherein a rotatable drive system component is located in the first compartment and a set of gears is located in the second compartment. The method includes rotating the rotatable drive system component and the set of gears based on torque received from an engine. The method further includes independently lubricating the rotatable drive system component and the set of gears with a lubrication system comprising a first lubrication system and a second lubrication system. The independently lubricating comprises: lubricating, by the first lubrication system, the rotatable drive system component in the first compartment; lubricating, by the second lubrication system, the set of gears in the second compartment; and inhibiting, by the barrier, a lubricant from passing between the first compartment and the second compartment.

BRIEF DESCRIPTION OF THE DRAWINGS

FIGS. 5A and 5C are cross-sectional views of a proprotor gearbox, in accordance with some embodiments of the present disclosure.

FIG. 5B illustrates a cross-section through the proprotor gearbox of FIG. 5A, in accordance with some embodiments of the present disclosure.

DETAILED DESCRIPTION

Figure 1A:
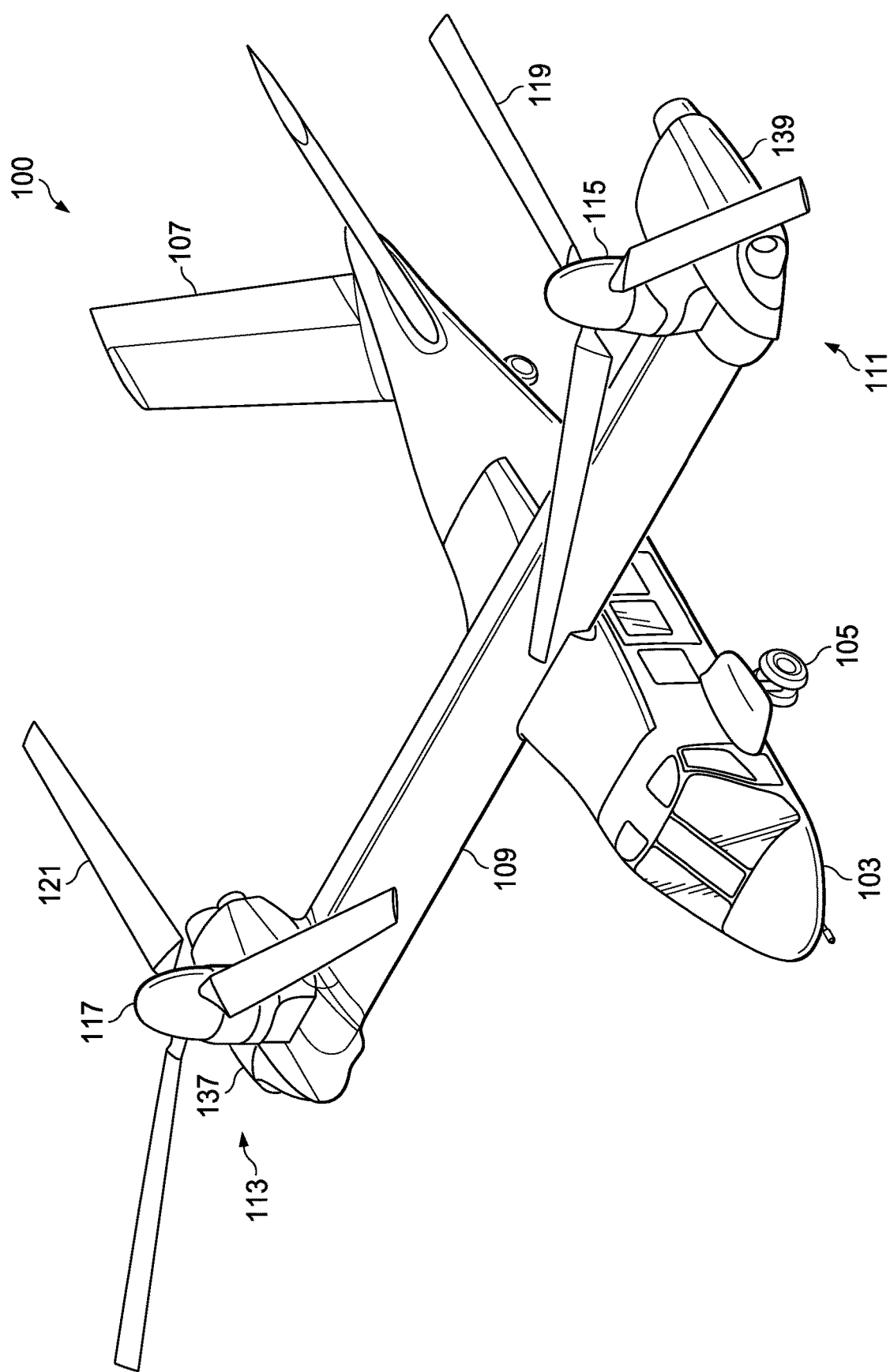
FIGS. 1A, 1B, 2A, and 2B illustrate example aircraft, in accordance with some embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiments, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
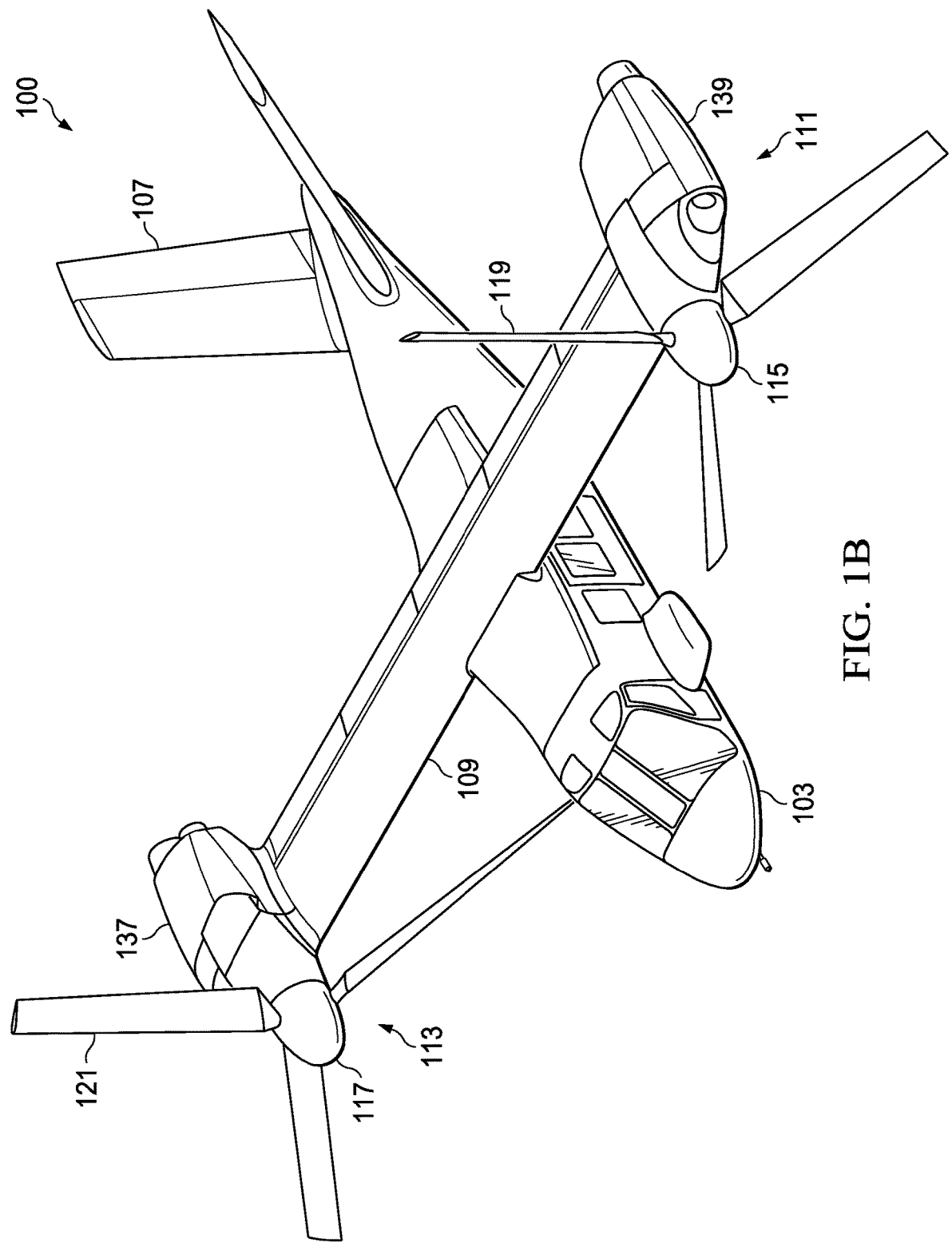

FIGS. 1A and 1B illustrate an exemplary aircraft, which in this case is a tiltrotor aircraft 100. Tiltrotor aircraft 100 can include a fuselage 103, a landing gear 105, a tail member 107, a wing 109, a drive system 111, and a drive system 113. Each drive system 111 and 113 includes a fixed engine 137 and fixed engine 139, respectively, and a proprotor 115 and 117, respectively. Each of the proprotors 115 and 117 is rotatable and has a plurality of rotor blades 119 and 121, respectively, associated therewith. The position of proprotors 115 and 117, as well as the pitch of rotor blades 119 and 121, can be selectively controlled in order to selectively control direction, thrust, and lift of the tiltrotor aircraft 100.

FIG. 1A illustrates the tiltrotor aircraft 100 in helicopter mode, in which proprotors 115 and 117 are positioned substantially vertical to provide a lifting thrust. FIG. 1B illustrates tiltrotor aircraft 100 in an airplane mode in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The drive system 113 is substantially symmetric to the drive system 111. Only for the sake of brevity, certain features will be disclosed only with regard to drive system 111. However, one of ordinary skill in the art will fully appreciate an understanding of the drive system 113 based upon the disclosure herein of the drive system 111.

Further, drive systems 111 and 113 are illustrated in the context of tiltrotor aircraft 100; however, drive systems 111 and 113 can be implemented on other tiltrotor aircraft. For example, alternative embodiments may include a quad tiltrotor that has an additional wing member aft of wing 109; the additional wing member can have additional drive systems similar to drive systems 111 and 113. In other embodiments, the drive systems 111 and 113 can be used with an unmanned version of tiltrotor aircraft 100. Further, drive systems 111 and 113 can be integrated into a variety of tiltrotor aircraft configurations. Additionally, other drive systems are contemplated. For example, in some embodiments a gearbox arrangement provides torque to a rotor system of a helicopter.

Figure 2A:
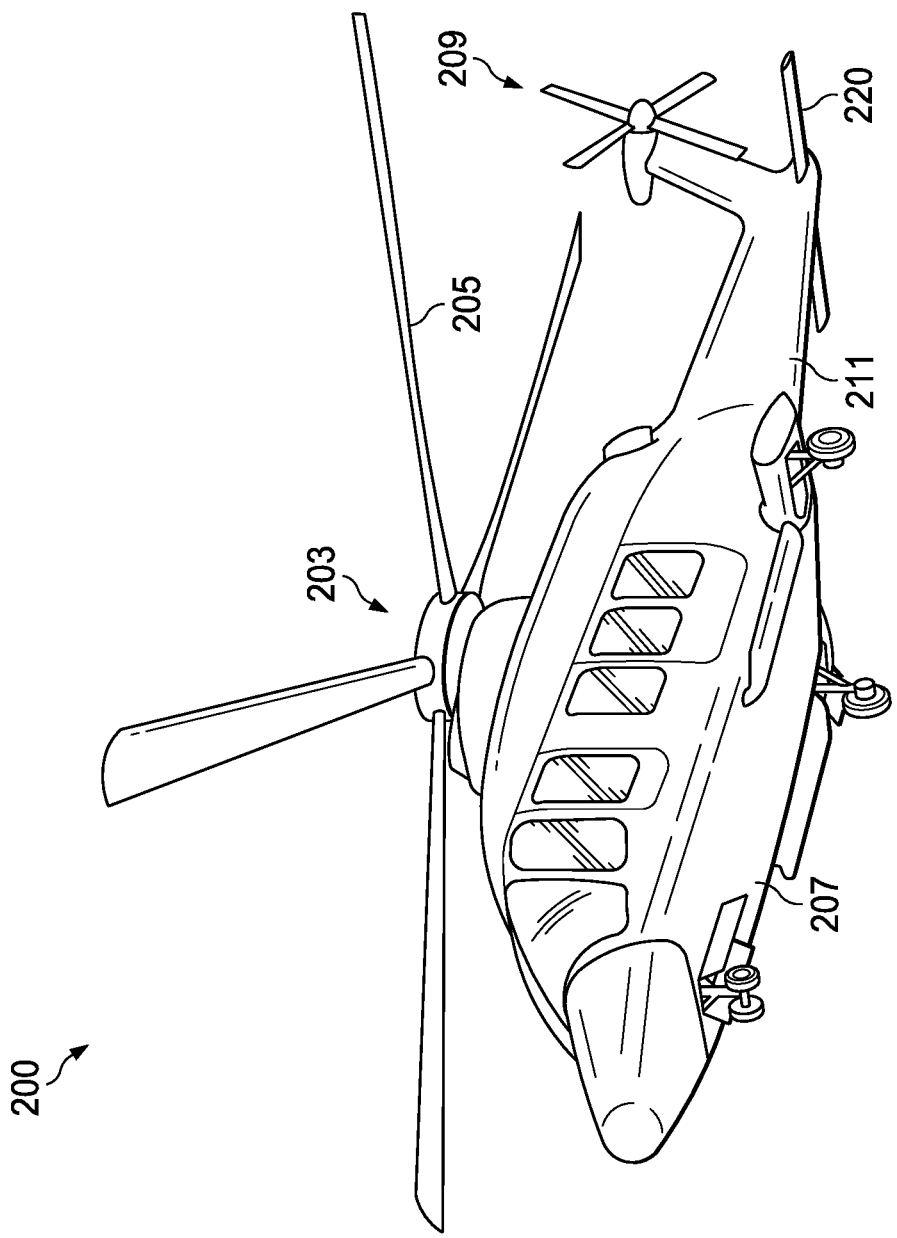
Figure 2B:
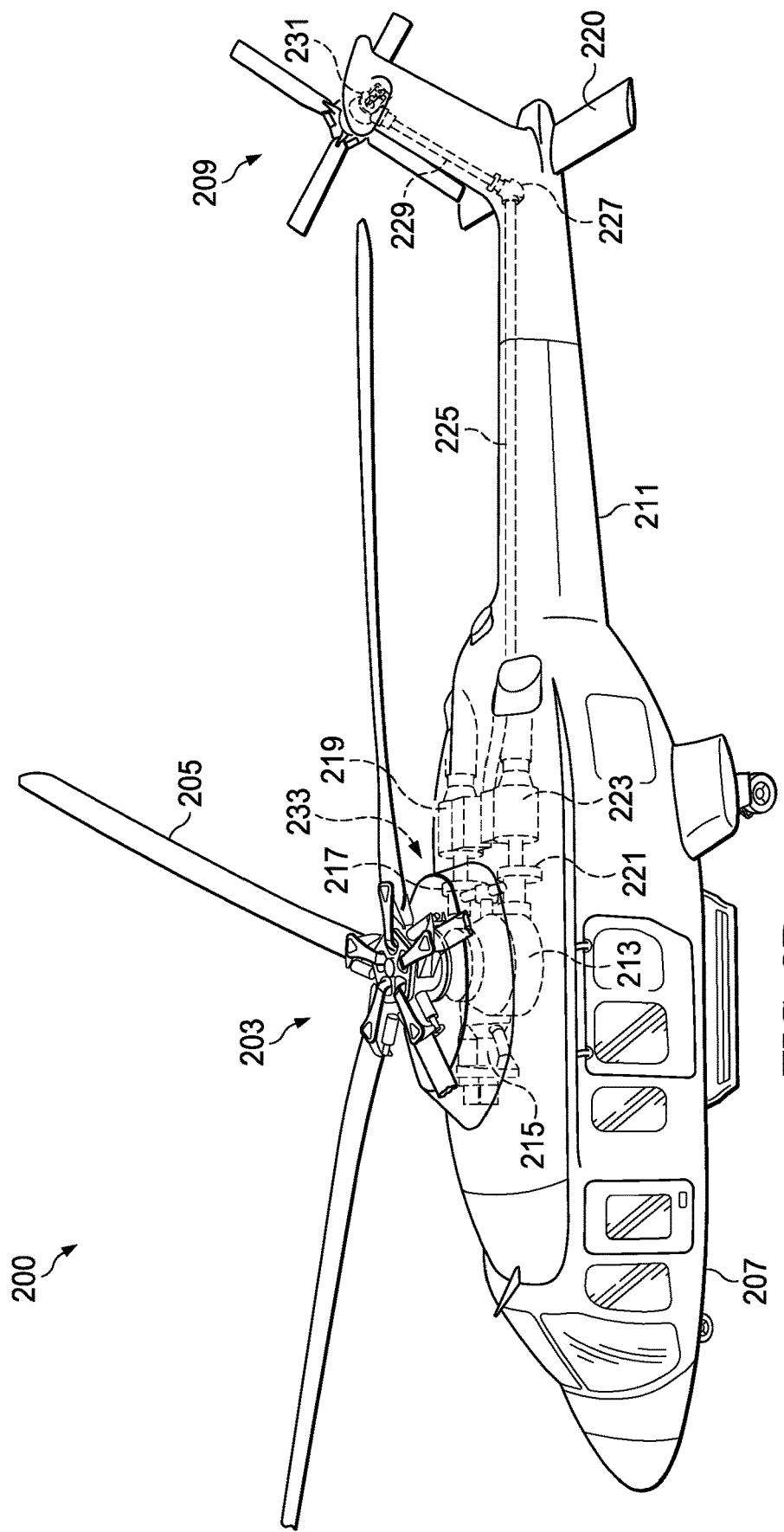

FIGS. 2A and 2B illustrate another exemplary aircraft, which in this case is a rotorcraft 200. FIG. 2A illustrates a perspective view of the rotorcraft 200, while FIG. 2B illustrates an alternative perspective view including some components of a drive system of the rotorcraft 200. Rotorcraft 101 includes an airframe (hidden beneath an outer mold line of the rotorcraft) and a rotor system 203 coupled to the airframe and the engines of the drive system. The rotor system 203 includes with a plurality of rotor blades 205. The pitch of each rotor blade 205 can be managed or adjusted in order to selectively control direction, thrust, and lift of the rotorcraft 200. The rotorcraft 200 further includes a fuselage 207, tail rotor and anti-torque system 209, an empennage 211, and a tail structure 220, each of which is attached to the airframe. The tail structure 220 may be used as a horizontal stabilizer. Torque is supplied to rotor system 203 and anti-torque system 209 from engines 223 and 219.

FIG. 2B illustrates additional details of a drive system 233 of the rotorcraft 200. The drive system 233 includes a main rotor gearbox 213, which connected to a rotor mast. The rotor mast is operable to rotate the rotors blades 205. The main rotor gearbox 213 is connected to one or more accessory gear boxes 215 and engine reduction gearboxes 217 and 221. Each of the engine reduction gearboxes 217 and 221 is connected to one or more engines 219 and 223 by a driveshaft. A tail rotor driveshaft 225 transmits mechanical rotation from the main rotor gearbox 213 to the tail rotor gear box 231, which is connected via tail rotor drive shaft 229 and intermediate gear box 227. The tail rotor gear box 231 is operable to rotate the tail rotor and anti-torque system 209.

It should be appreciated that the tiltrotor aircraft 100 of FIGS. 1A and 1B and the rotorcraft 200 of FIGS. 2A and 2B are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

When properly functioning, a lubrication system can reduce the likelihood of a drive system such as the drive systems 111 and/or 233 from losing torque, failing, and/or overheating. For example, a pressurized lubrication system may operate properly when the pressure is maintained above a threshold pressure limit such as about 30 pounds per square inch (PSI) or about 50 PSI. As another example, a non-pressurized lubrication system may operate properly when lubrication is maintained in contact with the drive system. A drive system is more susceptible to losing torque, failing (in whole or in part), and/or overheating when the lubrication system is malfunctioning and/or not functioning at all. For example, the pressurized lubrication system may not operate properly when the pressure drops below the threshold pressure limit. Lubrication systems can help to dissipate heat from and maintain the service life of a drive system. Maintaining a properly functioning lubrication system is critical to the safety and the service life of the aircraft.

Some gearboxes include a single lubrication system for providing lubricant to the components therein. In such gearboxes, a failure at any point in the lubrication system such as a gear, a shaft, a pump, a pressurized tube, and/or a sump can cause complete failure of the lubrication system resulting in the entire gearbox losing lubrication. In a pressurized lubrication system, such a failure can result in a loss of lubrication (LOL). LOL is characterized, for example, by the pressurized lubrication system reaching an operating pressure that is at or below the threshold pressure limit, for example, about 20 PSI, about 10 PSI, or about zero PSI. If the design of gears in the gearbox rely on the lubrication system to, e.g., maintain proper operating temperature, then any failure could result in a catastrophic failure of the gears in the gearbox and could hinder the ability of an aircraft to remain in flight. Some aviation regulations require that an aircraft's pressurized lubrication system remain operable for a specified amount of time after LOL. If a gearbox relies on a single pressurized lubrication system, a LOL could cause the entire gearbox to lose lubrication.

A solution to the above-identified challenges (and others) disclosed herein includes a compound lubrication system that includes multiple, independent lubrication subsystems to lubricate different sealed compartments of the same aircraft gearbox. Barriers seal the compartments from one another and inhibit and/or substantially prevent lubricant from travelling between the compartments. The barriers segregate the lubrication subsystems so that each can lubricate, in parallel and independent of one another, a different portion of the aircraft gearbox. The aircraft gearbox is intentionally segregated into compartments to maintain the independence of the lubrication subsystems. Collectively, the lubrication subsystems of the compound lubrication system reduce the likelihood of the entire aircraft gearbox experiencing a LOL due, in part, to the independence of the lubrication subsystems. The embodiments described throughout this disclosure provide numerous technical advantages including that some of the lubrication subsystems can continue to provide lubricant to a portion of a drive train even after one or more of the lubrication subsystems is no longer able to supply lubricant, e.g., due to a loss of lubricant event.

Figure 3:
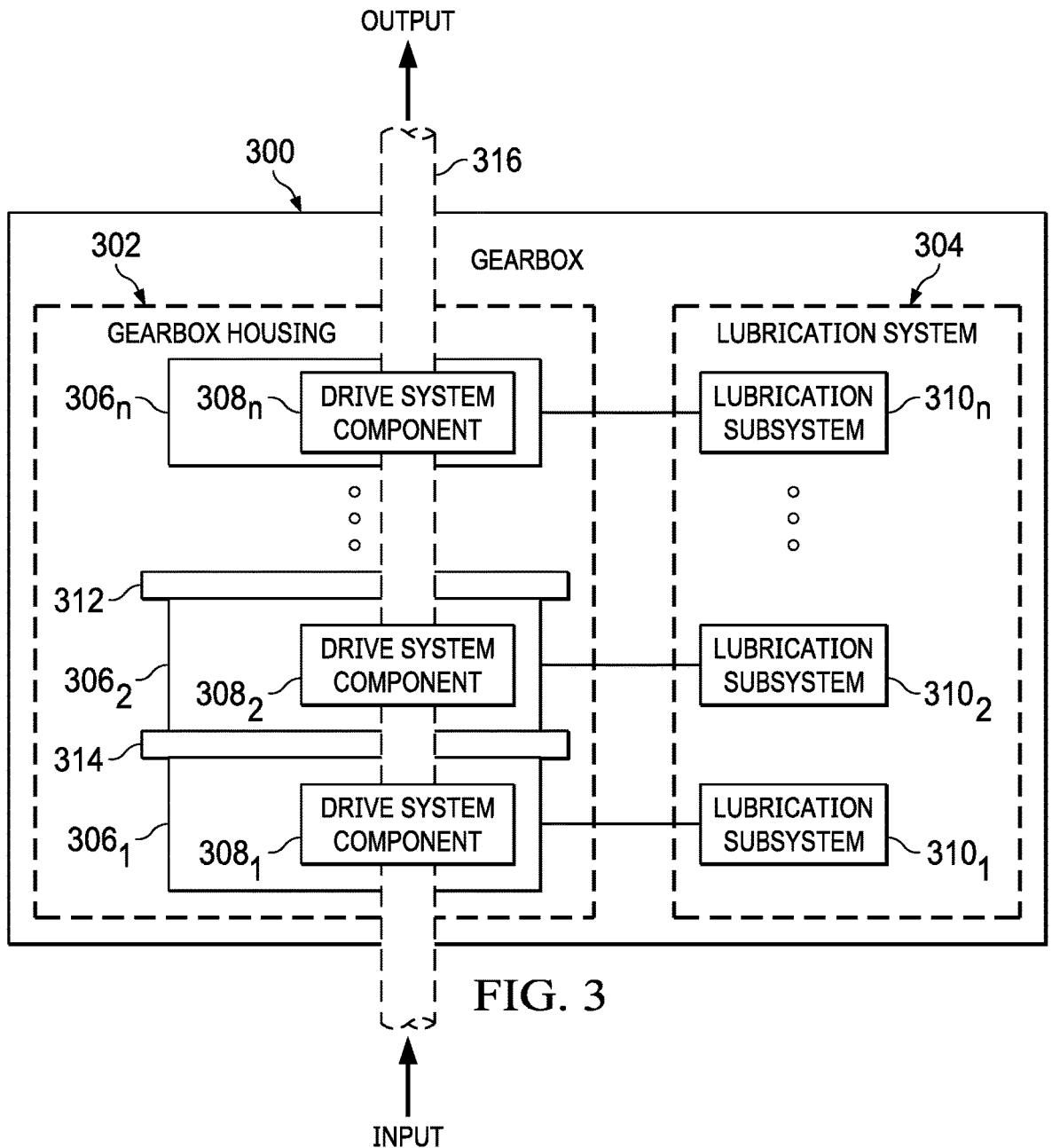
FIG. 3 illustrates a simplified diagram of a gearbox in a drive system of an aircraft, in accordance with some embodiments of the present disclosure.

FIG. 3 illustrates a simplified diagram of a gearbox 300. The gearbox 300 includes a housing 302 and a lubrication system 304. Barriers 312 and 314 separate a plurality of compartments within the housing 302. The plurality of compartments includes compartments $306_1$, $306_2$, ... and $306_n$. The compartments $306_1$, $306_2$, ... and $306_n$ enclose drive system components $308_1$, $308_2$, ... and $308_n$, respectively. The drive system component $308_1$ is located in the compartment $306_1$. The drive system component $308_2$ is located in the compartment $306_2$. The drive system component $308_n$ is located in the compartment $306_n$. In some embodiments, the gearbox 300 includes at least a portion of a driveshaft 316. The driveshaft 316 receives an input torque at one end, transfers a portion of the input torque to each of the drive system components 308, and generates an output torque at a second end. A drive system component can include one or more of, e.g., a mast, a shaft (such as a driveshaft, gear shaft, and the like), bearings, a gear, or any other rotatable drive system component. The lubrication system 304 includes a plurality of lubrication subsystems including lubrication subsystems $310_1$, $310_2$, ... and $310_n$. Each of the plurality of lubrication subsystems is, at least in part, independent from others of the lubrication subsystems. In addition, each of the plurality of lubrication subsystems may be a different type of lubrication system such as pressurized, non-pressurized, active, passive, and the like. The lubrication subsystem $310_1$ lubricates the drive system component $308_1$ in the compartment $306_1$. The lubrication subsystem $310_2$ lubricates the drive system component $308_2$ in the compartment $306_2$. The lubrication subsystem $310_n$ lubricates the drive system component $308_n$ in the compartment $306_n$. Such lubrication can include spraying, splashing, dispensing, or otherwise dispersing a lubricant onto the corresponding drive system component. The barrier 314 inhibits lubricant from passing between the compartment $306_1$ and compartment $306_2$. The barrier 312 inhibits lubricant from passing between the compartment $306_2$ and compartment $306_n$. It will be appreciated by those of skill in the art that the housing 302 can be segregated in virtually any number of different compartments, e.g., where n is a positive, non-zero integer.

A lubricant is a substance introduced to reduce friction between moving surfaces. Examples of lubricants can include grease (e.g., petroleum-based or synthetic), oil, biolubricants derived from plants and animals, synthetic oils, solid lubricants, and aqueous lubricants. Example lubricants may include oils meeting United States Military specification MIL-PRF-23699 (5 cSt), United States Department of Defense (DoD) specifications DOD-L-7808 (3-4 cSt) and DOD-PRF-85734 (5 cSt), and other oils in the 9 cSt to 10 cSt viscosity range. The gearbox 300 may include one or more lubrication systems to provide lubricant to drive system components 308 and/or other the mechanical components.

Figure 4:
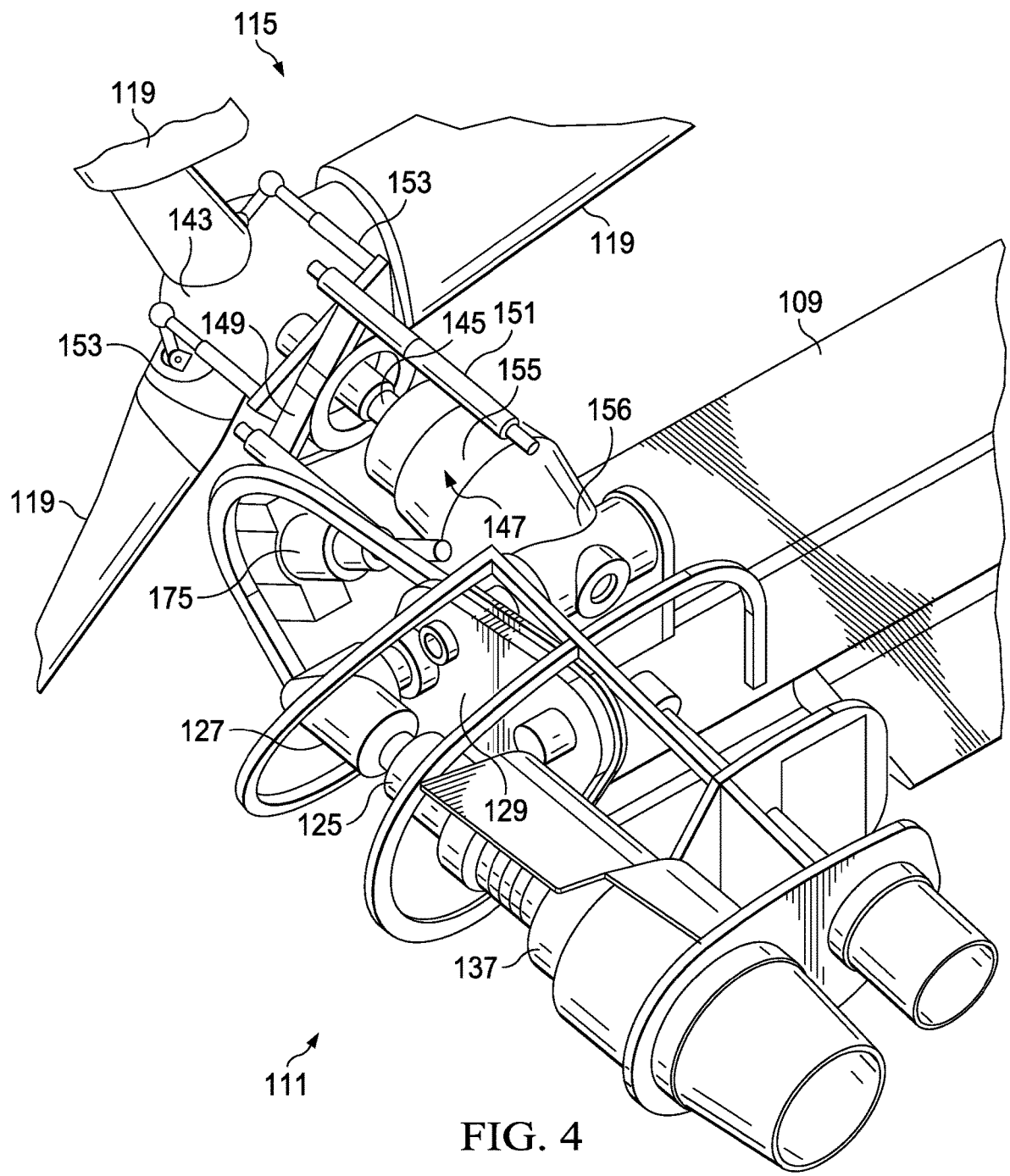
FIG. 4 shows a three-dimensional view of a drive system of a tiltrotor aircraft, in accordance with some embodiments of the present disclosure.

FIG. 4 shows a perspective view of the drive system 111 of the tiltrotor aircraft 100 of FIGS. 1A and 1B, in accordance with some embodiments of the present disclosure. The drive system 111 includes a fixed engine 137 that is fixed relative to the wing 109. The fixed engine 137 transfers power to the proprotor 115 and several auxiliary systems via a gearbox 129. An engine output shaft 125 transfers power from the fixed engine 137 to a spiral bevel gearbox 127 that includes spiral bevel gears to change torque direction by 90 degrees from the fixed engine 137 to the gearbox 129 via a clutch. The gearbox 129 includes a plurality of gears in a gear train that are coupled to a spiral bevel gear assembly, an interconnect drive shaft, and auxiliary systems including a lubrication system pump, a blower gearbox, a generator, and a hydraulic pump. Torque is transferred to an input in the spiral bevel gear assembly of proprotor gearbox 147. The proprotor gearbox 147 can include a plurality of gears that can be configured to transfer power and reduce rotational speed to a mast 145, which rotates the rotor blades 119.

The proprotor 115 of the drive system 111 can include a yoke 143 coupled to the rotor blades 119 and to the mast 145. The mast 145 is coupled to a proprotor gearbox 147. the proprotor 115 include other components, such as a swashplate 149 that can be selectively actuated by a plurality of actuators 151 to selectively control the pitch of rotor blades 119 via pitch links 153. During operation, a conversion actuator 175 can be actuated so as to selectively rotate proprotor gearbox 147 to selectively positions the proprotor 115 between helicopter mode (shown in FIG. 1A) and airplane mode (shown in FIG. 1B).

Gears, bearings, and other mechanical components of drive system 111 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load (pressure generated) between the opposing surfaces and to help transfer heat away from the surfaces. The proprotor gearbox 147 of the drive system 111 is an example of the gearbox 300 and, therefore, includes a lubrication system as described with respect to FIG. 3; further details of the lubrication system are described below.

FIG. 5A is cross-sectional view of the proprotor gearbox 147 of the drive system 111, according to some embodiments. The proprotor gearbox 147 is configured to transfer power and reduce speed to the mast 145. The mast 145 is supported by and rotates within bearings 181 and 183. The proprotor gearbox 147 includes an upper housing 155 portion and a lower housing 156. The upper housing 155 and the lower housing 156 are attached to one another creating a single cavity that encloses the components of the proprotor gearbox 147. The low speed planetary gear assembly 159 and a high speed planetary gear assembly 161 reduce the rotational speed from a spiral bevel gear assembly 163 to the mast 145. The high speed planetary gear assembly 161 nests within an opening in the low speed planetary gear assembly 159. The spiral bevel gear assembly 163 includes a spiral bevel gear input 167 and a spiral bevel gear output 171. Spiral bevel gear assembly 163 changes power direction from along a centerline axis 165 of spiral bevel gear input 167 to a centerline axis 169 of spiral bevel gear output 171. A bearing support 517 extends between an inner face of the lower housing 156 and the spiral bevel gear output 171 and supports the spiral bevel gear output 171 against the lower housing 156. The bearing support 517 facilitates rotation of the spiral bevel gear output 171. An accessory drive 173 can be coupled to spiral bevel gear output 171. In some examples, a heat exchanger gearbox can be coupled to the spiral bevel gear output 171 and can be configured to provide torque to a heat exchanger such as an oil cooler blower fan, which may be used to draw in air for lubricant temperature reduction. It should be appreciated that proprotor gearbox 147 can include any bearings, lubrication systems (e.g., as described below), and other gearbox related components that may be beneficial for operation.

The proprotor gearbox 147 is separated into multiple compartments that enclose different drive system components and are lubricated by a lubrication system that includes multiple lubrication subsystems. The proprotor gearbox 147 includes barriers 509, 512, and 516, which form compartments 502, 504, 506, and 508. A portion of the mast 145 and the bearings 181 and 183 are located in the compartment 502. The low speed planetary gear assembly 159 is located in the compartment 504. The high speed planetary gear assembly 161 is located in the compartment 506. The spiral bevel gear assembly 163 is located in the compartment 508. The seals 510, 514, and 518 seal a perimeter of the barriers 509, 512, and 516, respectively. The barrier 509 extends between an inner face of the upper housing 155 and the low speed planetary gear assembly 159 and lies between the compartments 502 and 504. The seal 510 seals an edge of the barrier 509 proximate the low speed planetary gear assembly 159. The barrier 509 can be attached to and/or sealed at an edge proximate the inner face of the upper housing 155. The barrier 509 and/or the seal 510 can prevent lubricant from passing between the compartments 502 and 504. The barrier 512 extends between an inner face of the lower housing 156 and the high speed planetary gear assembly 161 and lies between the compartments 504 and 506. The seal 514 seals an edge of the barrier 512 proximate the high speed planetary gear assembly 161. The barrier 512 can be attached to and/or sealed at an edge proximate the inner face of the lower housing 156. The barrier 512 and/or the seal 514 can prevent lubricant from passing between the compartments 504 and 506. The barrier 516 extends between an inner face of the lower housing 156 and the spiral bevel gear output 171 and lies between the compartments 506 and 508. The seal 518 seals an edge of the barrier 516 proximate the spiral bevel gear output 171. The barrier 516 can be attached to and/or sealed at an edge proximate the inner face of the lower housing 156. The barrier 516 and/or the seal 518 can prevent lubricant from passing between the compartments 506 and 508. Each of the barriers is made of a rigid, material such as a metal, a composite material (such as a laminate material or a reinforced polymer). In some examples one or more of the barriers 509, 512, and 516 is a sump for collecting, draining and/or recycling lubricant from the corresponding compartment. Each of the barriers is disc-shaped and can serve as a sump for collecting lubricant on one or more adjacent compartments. For example, FIG. 5B illustrates a cross-section through the proprotor gearbox 147 as generally indicated by the arrows labeled "5B" in FIG. 5A. The cross-section shows an alternate view of the barrier 509. The barrier 509 is a disc-shaped plate that can serve as a sump for collecting lubricant in the compartments 502 and/or 504, e.g., depending on whether the proprotor is positioned in helicopter mode or airplane mode.

Figure 5C:
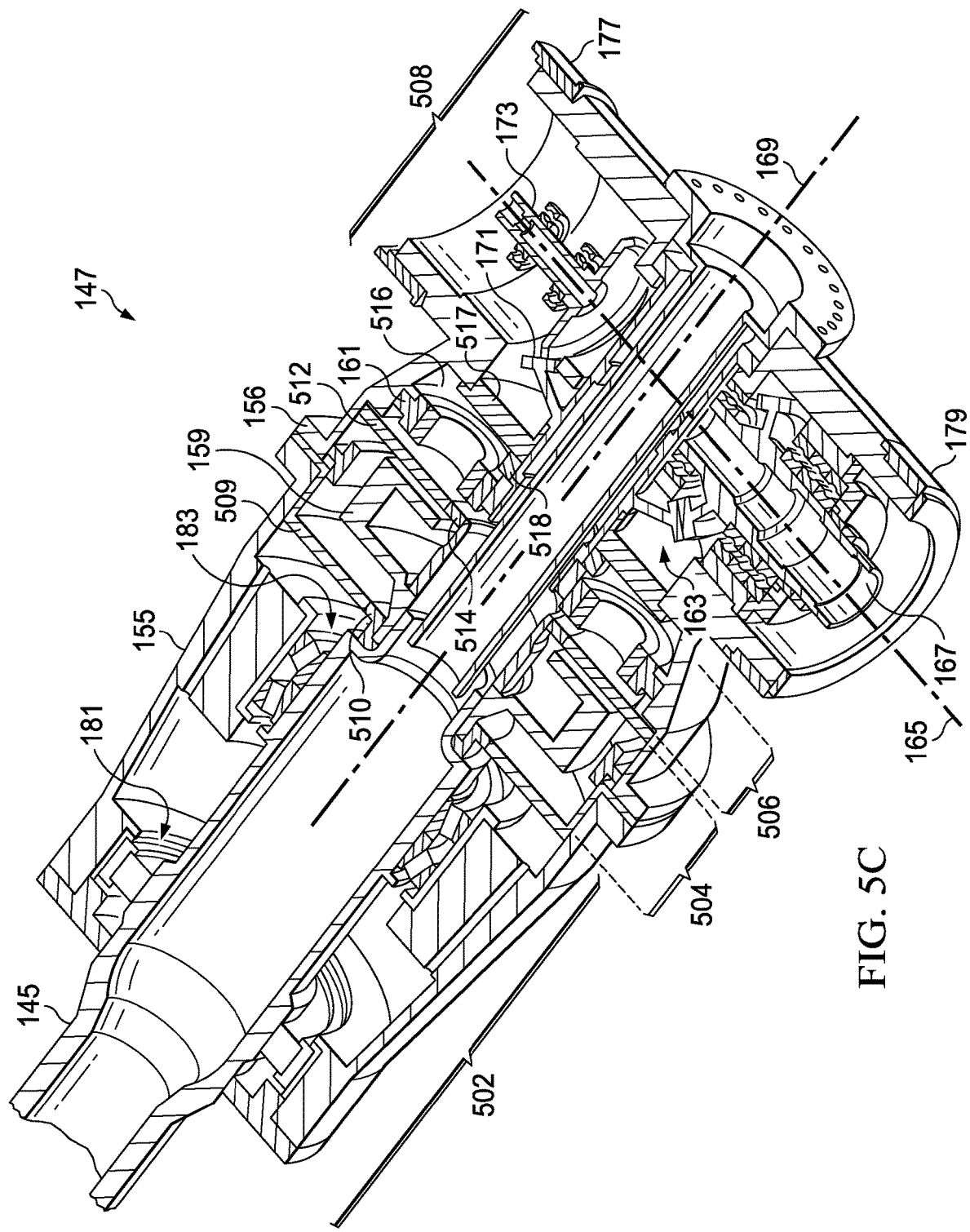

FIG. 5C illustrates the proprotor gearbox 147 of the drive system 111, in accordance with some embodiments, as an alternative to that illustrated in FIG. 5A. The description of the proprotor gearbox 147 of the drive system 111 is not repeated here only for the sake of brevity. A difference between the FIG. 5A and the FIG. 5C is that FIG. 5A includes a barrier 516 while the FIG. 5C lacks the barrier 516. Instead, the system of FIG. 5C utilizes the seal 518 to seal between the bearing support 517 and the spiral bevel gear output 171 to segregate the compartments 506 and 508 from one another. This alternative can reduce the number of parts and/or weight of the system components relative to the FIG. 5A. Another difference between the FIG. 5A and the FIG. 5C is that, in FIG. 5A, the barrier 509 spans between the low speed planetary gear assembly 159 and the inner surface of the upper housing 155 while, in FIG. 5C, the barrier 509 spans from the low speed planetary gear assembly 159 and is clamped between the upper housing 155 and the lower housing 156; in addition, the seal 510 wraps around an interface between the mast 145 and the low speed planetary gear assembly 159. This alternative can improve the resistance to lubricant passing between the compartments 502 and 504. Because the barrier 509, in FIG. 5C, extends to an extreme edge of the upper housing 155 and the lower housing 156, it prevents lubricant from potentially crossing between the barrier 509 and the inner surface of the upper housing 155. Because the seal 510 in FIG. 5C, extends to the interface between the low speed planetary gear assembly 159 and the mast 145, it prevents lubricant from potentially crossing between the low speed planetary gear assembly 159 and the mast 145.

Figure 6:
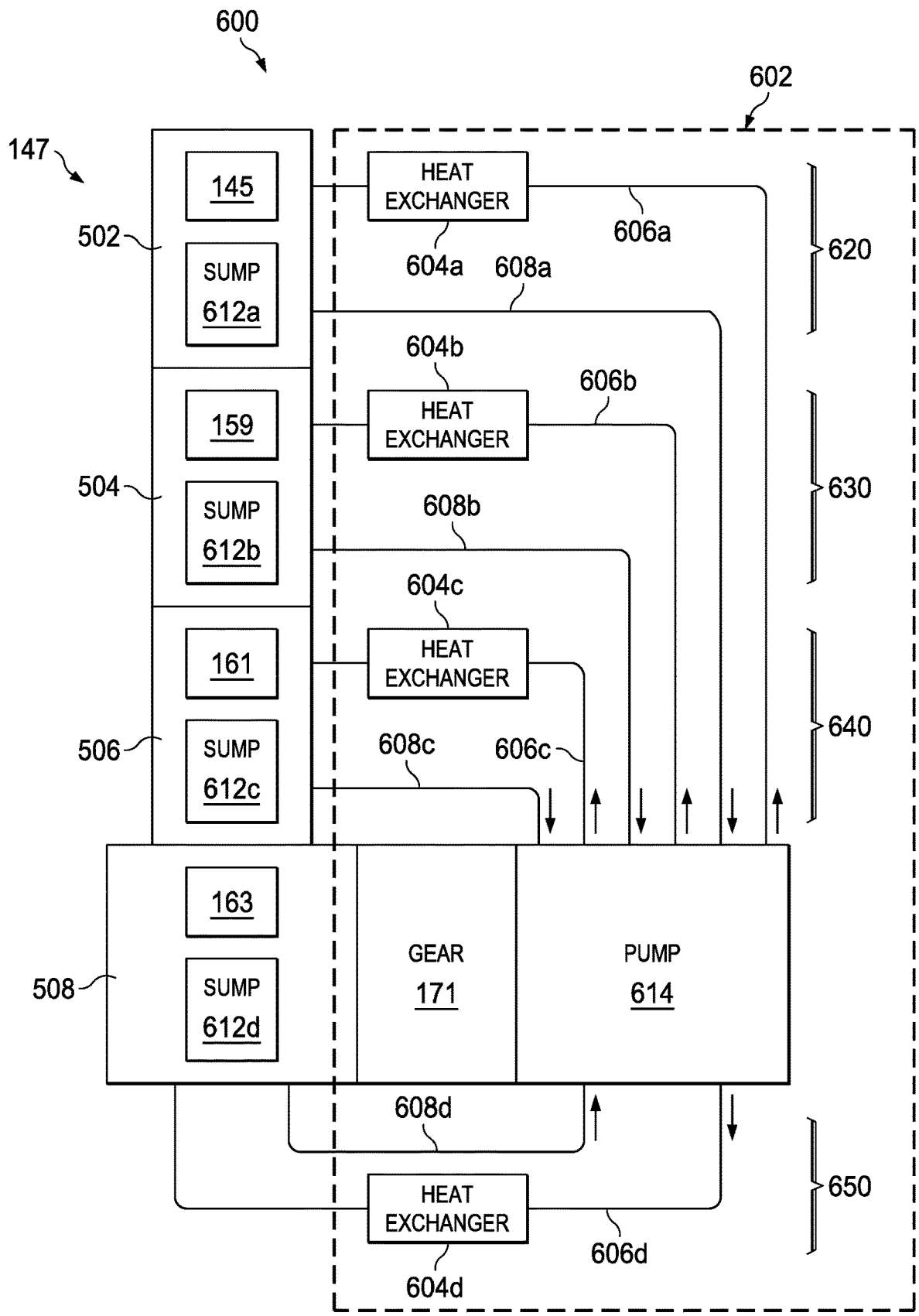
FIG. 6 shows a schematic view of a lubrication arrangement of the drive system of FIG. 5A, in accordance with some embodiments of the present disclosure.

FIG. 6 shows a schematic view of a lubrication arrangement of the proprotor gearbox 147 of FIG. 5A, in accordance with some embodiments of the present disclosure. System 600 includes the proprotor gearbox 147, which is separated into the compartments 502, 504, 506, and 508 as described above with respect to FIG. 5A. A portion of the mast 145 is located in the compartment 502. The low speed planetary gear assembly 159 is located in the compartment 504. The high speed planetary gear assembly 161 is located in the compartment 506. At least a portion of the spiral bevel gear assembly 163 is located in the compartment 508. The compartments 502, 504, 506, and 508 include sumps 612a, 612b, 612c, and 612d, respectively. In some embodiments, the sumps 612a, 612b, 612c, and 612d include barriers and/or seals such as the barriers and seals described with respect to FIGS. 5A and 5B.

The proprotor gearbox 147 includes a lubrication system 602, which includes the spiral bevel gear output 171, a pump 614, and lubrication subsystems 620, 630, 640, and 650. The spiral bevel gear output 171 provides power to the pump 614. The pump 614 is operable to pump lubricant to the lubrication subsystems 620, 630, 640, and 650. The pump 614 separately pumps lubricant to each of the lubrication subsystems 620, 630, 640, and 650. The lubrication subsystems 620, 630, 640, and 650 lubricate drive system components in the compartments 502, 504, 506, and 508, respectively. The lubrication subsystem 620 lubricates the mast 145 and/or associated bearings 181 and 183 (shown in FIG. 5A). The lubrication subsystem 630 lubricates the low speed planetary gear assembly 159 in the compartment 504. The lubrication subsystem 640 lubricates the high speed planetary gear assembly 161 in the compartment 506. The lubrication subsystem 650 lubricates the at least a portion of the gear assembly 163 in the compartment 508. As described with respect to FIGS. 5A and 5B, barriers can prevent lubricant from passing between the compartments 502, 504, 506 and 508. Each of the lubrication subsystems 620, 630, 640, and 650 include a supply line (e.g., 606a, 606b, 606c, and 606d, respectively), a heat exchanger (e.g., 604a, 604b, 604c, and 604d) located along the supply line, and a return line (e.g., 608a, 608b, 608c, and 608d, respectively). The supply lines deliver the lubricant from the pump 614 to a drive system component in the corresponding compartment. The return lines deliver the lubricant from a sump in the corresponding compartment to the pump 614. In some embodiments, the supply lines and/or the return lines include tubes, pipes, and/or ducts to carry the lubricant. The heat exchangers can utilize a liquid such as air, water, or a refrigerant to reduce a temperature of the lubricant. The lubrication subsystem 620 utilizes the supply tube 606a to deliver the lubricant from the pump 614 to the mast 145 and/or associated bearings 181 and 183 in the compartment 502 via the heat exchanger 604a. The lubricant collects in the sump 612a in the compartment 502. The lubrication subsystem 620 utilizes the return tube 608a to deliver the lubricant from the sump 612a back to the pump 614. Each of the lubrication subsystems 630, 640, and 650 can operate in the manner as described for the lubrication subsystem 620; the description of these lubrication subsystems is not repeated here only for the sake of brevity.

Each of the lubrication subsystems 620, 630, 640, and 650 is, at least in part, independent of others of the lubrication subsystems. Each of the subsystems includes independent supply lines, return lines, and heat exchangers. Advantageously, some of the lubrication subsystems 620, 630, 640, and 650 can continue to lubricate its corresponding compartment in the proprotor gearbox 147 even when one or more of the lubrication subsystems fails. For example, when the supply line 606b in the lubrication subsystem 630 is damaged, it can cause lubricant to be lost from the low speed planetary gear assembly 159 in the compartment 504 and cause, e.g., a LOL in the lubrication subsystem 630 and the compartment 504. In such a case, each of the lubrication subsystems 620, 640, and 650 can continue to properly lubricate the portion of the mast 145, the low speed planetary gear assembly 159, and the spiral bevel gear assembly 163 since the supply line and return lines of these lubrication subsystems is independent from those in the lubrication subsystem 630.

Figure 7:
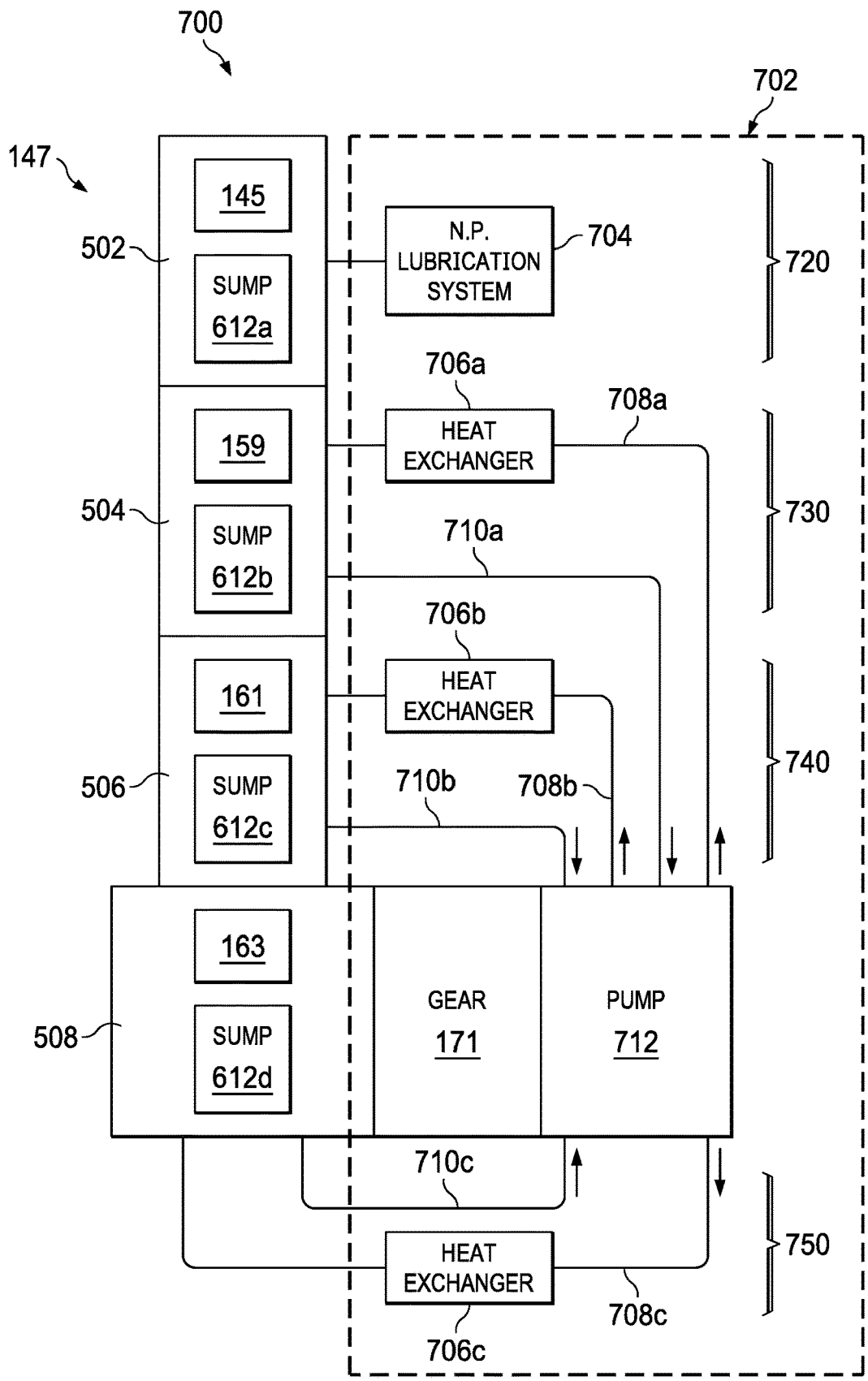
FIG. 7 shows a schematic view of another lubrication arrangement of the drive system of FIG. 5A, in accordance with some embodiments of the present disclosure.

FIG. 7 shows a schematic view of another lubrication arrangement of the proprotor gearbox 147 of FIG. 5A, in accordance with some embodiments of the present disclosure. System 700 includes the proprotor gearbox 147, which is separated into the compartments 502, 504, 506, and 508. Details of the proprotor gearbox 147 (e.g., sumps 612a, 612b, 612c, and 612d and drive system components 145, 159, 161, 163) are described with respect to FIG. 6; the description is not repeated here only for the sake of brevity.

The proprotor gearbox 147 includes a lubrication system 702, which includes the spiral bevel gear output 171, a pump 712, and lubrication subsystems 720, 730, 740, and 750. The lubrication subsystems 720 is a non-pressurized lubrication system and each of the lubrication subsystems 730, 740, and 750 are pressurized lubrication systems. The spiral bevel gear output 171 provides power to the pump 712, which in turn, pumps lubricant separately to each of the lubrication subsystems 730, 740, and 750. The lubrication subsystems 730, 740, and 750 include a supply line (e.g., 708a, 708b, and 708c, respectively), a heat exchanger (e.g., 706a, 706b, and 706c, respectively), and a return line (e.g., 710a, 710b, and 710c, respectively). Each of the lubrication subsystems 730, 740, and 750 can operate in the manner as described with respect to the lubrication subsystems 620, 630, 640, and 650 of FIG. 6; the description of these lubrication subsystems is not repeated here only for the sake of brevity.

A difference between the lubrication system 602 of FIG. 6 and the lubrication system 702 of FIG. 7 is that the lubrication system 702 includes a non-pressurized lubrication system while the lubrication system 602 includes only pressurized lubrication systems. A non-pressurized lubrication system can include a passive lubrication system such as splash-based systems, greased systems (e.g., petroleum based or synthetic), and others. Such passive lubrication systems may rely on a viscosity of lubricant to maintain contact with a drive system component and/or a pool of lubricant into which the drive system component dips during operation. Advantageously, lubrication subsystems 720 can continue to properly function even after all of the pressurized lubrication systems in the lubrication system 702 have failed. Because the lubrication subsystem 720 is non-pressurized, it operates independent of the pump 712; thus, the lubrication subsystem 720 can continue to lubricate the mast 145 regardless of whether the pump 712 is functioning. It is noted that the schematic views of lubrication arrangements of the FIGS. 6 and 7 are equally applicable to the proprotor gearbox 147 of FIG. 5C.

Figure 8:
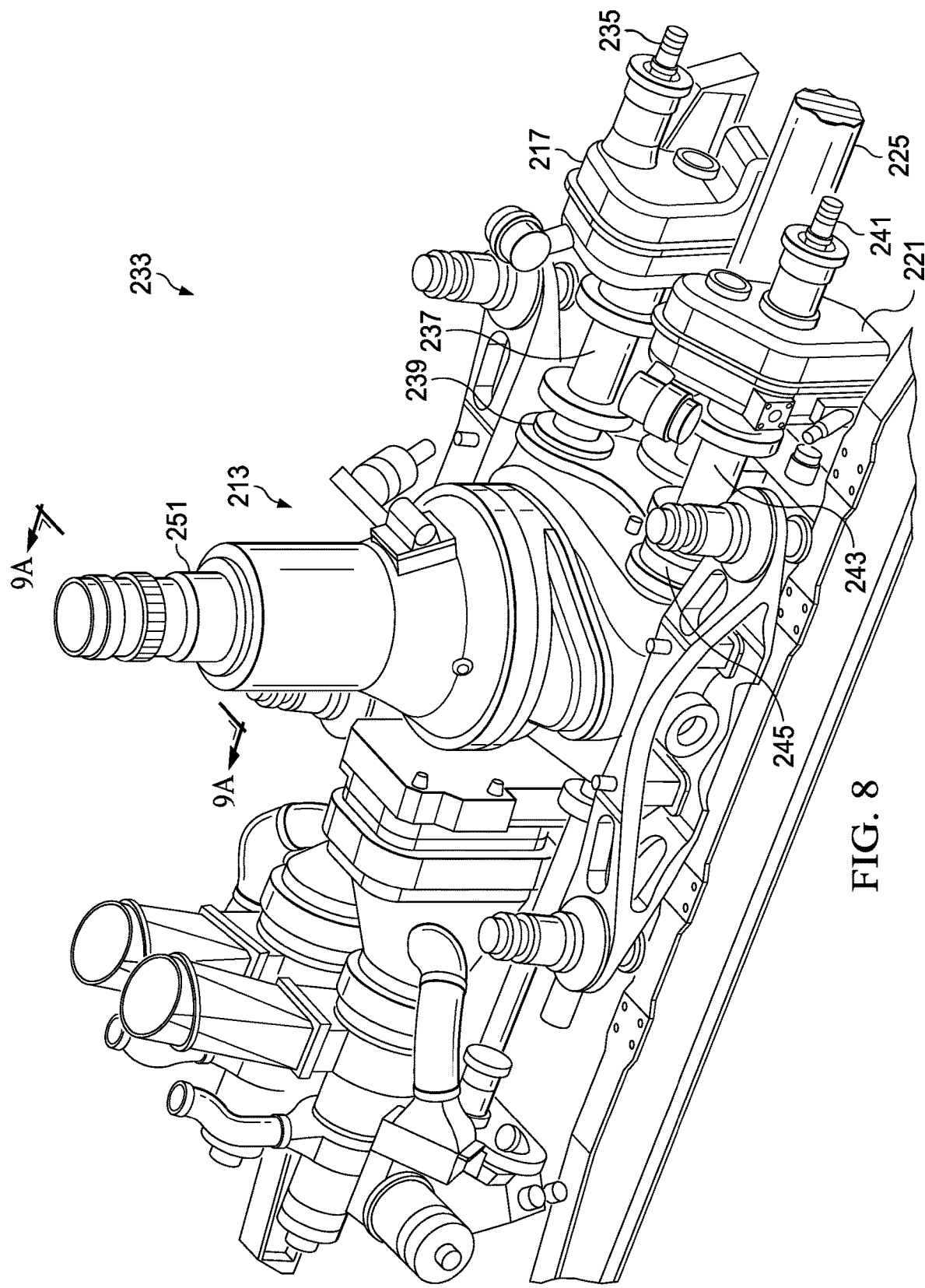
FIG. 8 shows a three-dimensional view of the drive system of the aircraft of FIGS. 2A and 2B, in accordance with some embodiments of the present disclosure.

FIG. 8 shows an isometric view of the drive system 233 of the rotorcraft 200 of FIGS. 2A and 2B, in accordance with some embodiments of the present disclosure. The drive system 233 includes two engine reduction gearboxes 217 and 221, that are each depicted with an engine connection driveshaft 235 and 241, respectively. Each of the engine reduction gearboxes 217 and 221 is connected via a separate driveshafts 237 and 243 to the main rotor gearbox 213. Thus, each of the driveshafts 237 and 243 provides a single drive system from the engines to the main rotor gearbox 213, each of which operates independently and redundantly to provide power to the main rotor gearbox 213. Further, each of the engine reduction gearboxes 217 and 221 reduces the speed of rotation from the engine (e.g., up to a high speed at or near turbine engine speed of greater than 10,000 RPM) to a speed substantially lower than the high speed, a low speed of less than about 6,000 RPM prior to entering the main rotor gearbox 214. The main rotor gearbox 213 receives power from the engines and transmits the power to mast 251, which rotates rotor blades (e.g., rotor blades 205 of FIGS. 1A and 1B). The mast 251 and driveshafts 237 and 243 can include one- or multiple-piece shaft assemblies and can comprise a single material or a composite material.

Figure 9A:
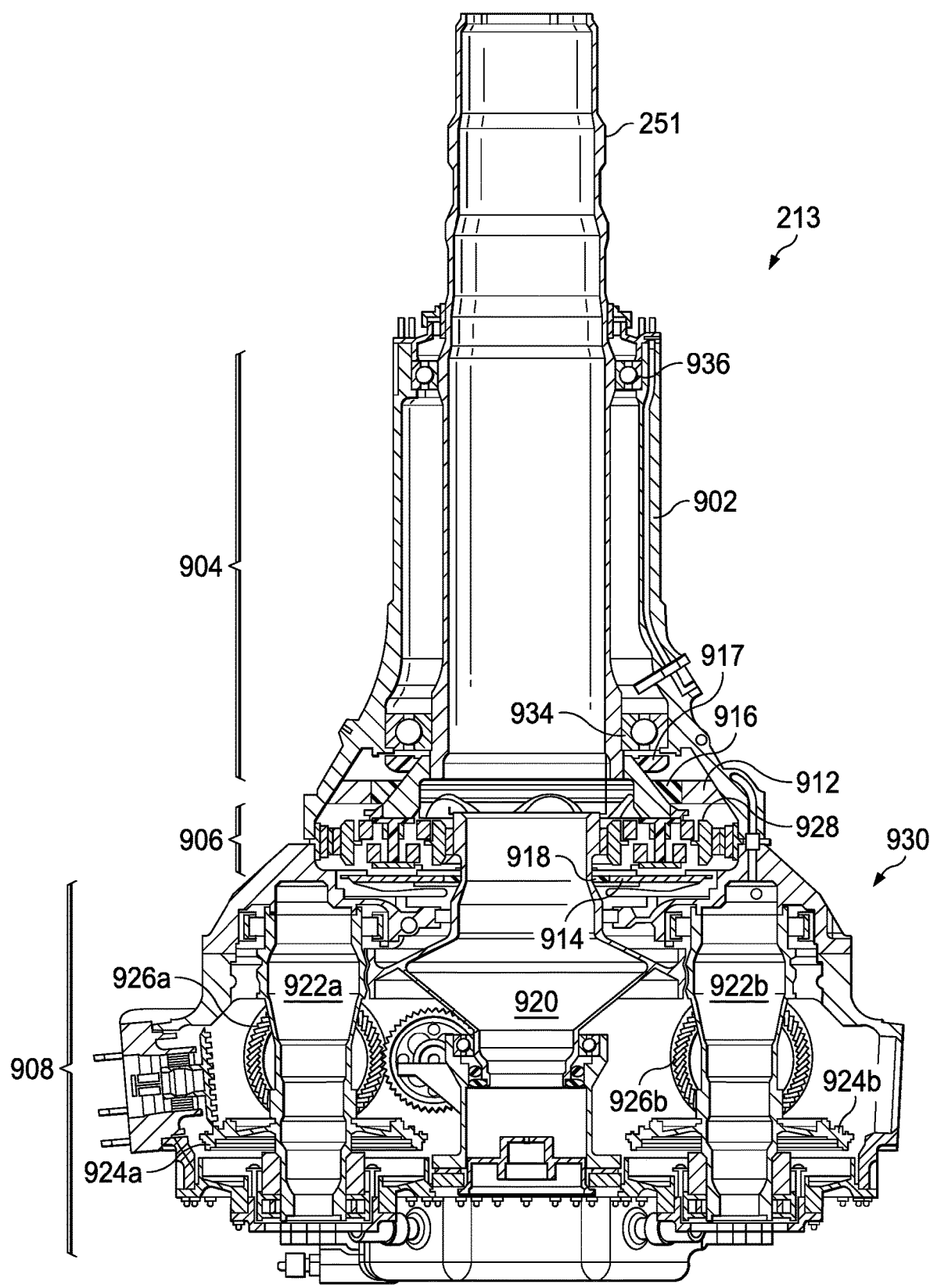
FIGS. 9A and 9C are cross-sectional views of a main rotor gearbox in the drive system of FIG. 8, in accordance with some embodiments of the present disclosure.
Figure 9B:
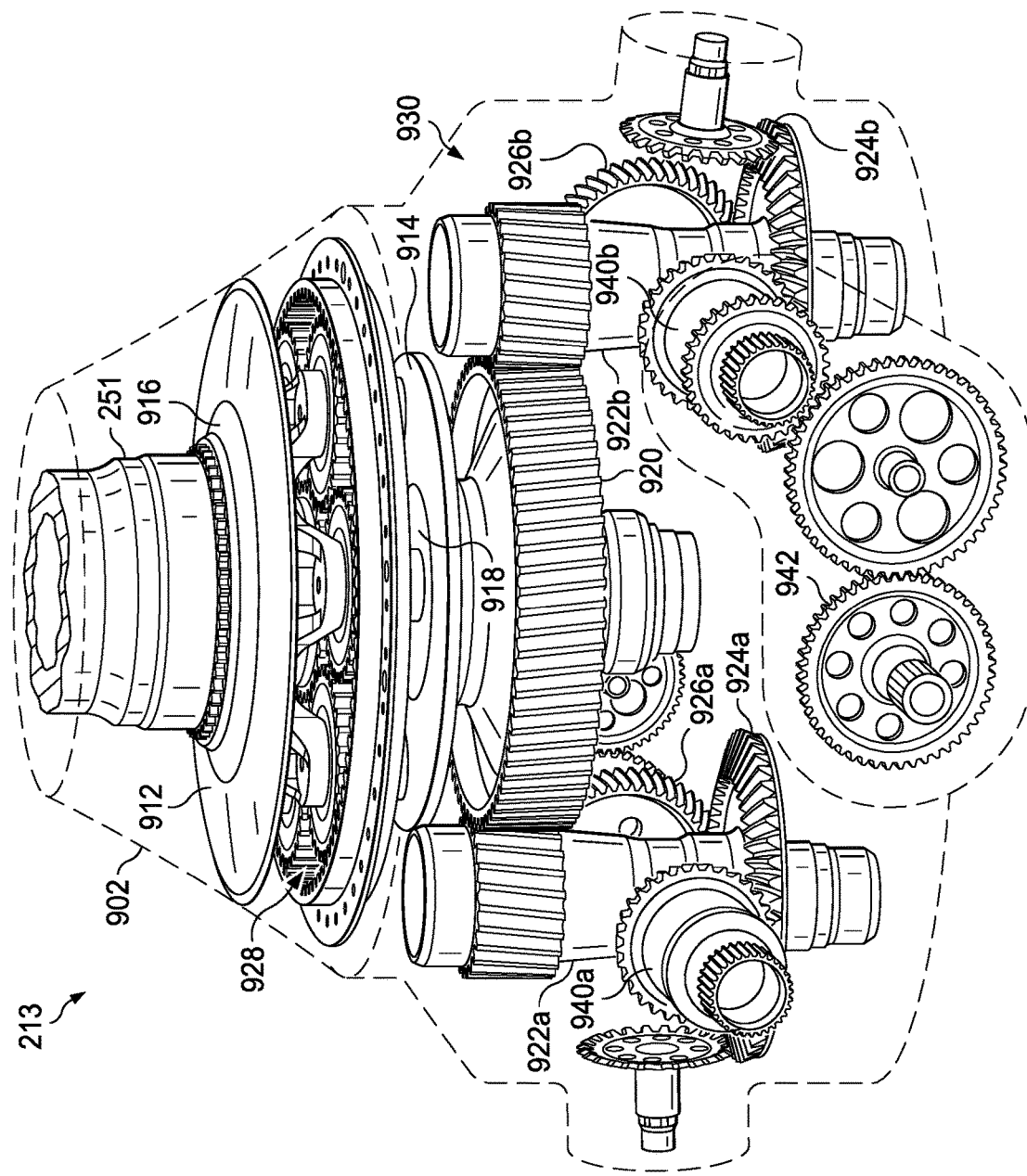
FIG. 9B shows a three-dimensional view of the main rotor gearbox of FIGS. 8 and 9A, in accordance with some embodiments of the present disclosure.

FIGS. 9A and 9B illustrate further details of the drive system 233, in accordance with some embodiments of the present disclosure. FIG. 9A is cross-sectional view of the main rotor gearbox of the drive system 233 as generally indicated by the arrows labeled "9A" in FIG. 8. FIG. 9B shows a three-dimensional view of the main rotor gearbox 213.

The main rotor gearbox 213 includes a housing 902, a driveshaft assembly, and a gear train 930. The driveshaft assembly includes the mast 251, a gear shaft of gear 920, and a gear shaft of gears 928. The gear train 930 includes gears 920, 922a, 922b, 924a, 924b, 926a, 926b, 940a, 940b, and 942. Each of the gears includes a gear shaft about which the gear rotates and a plurality of teeth that are operable to mate with one or more adjacent gears. As the engines 223 and 219 (FIG. 2B) generate power, the power is transmitted to the driveshafts 243 and 237 via the engine reduction gearboxes 221 and 217, respectively (FIG. 8). The driveshafts 243 and 237 transmit power to the gears 940a and 940b, respectively, each of which is a compound gear. The gears 940a and 940b transmit power to the gears 922a and 922b, respectively. In addition, the gear 940b transmits power to the gear 942, which is an output gear that transmits power to the tail rotor driveshaft 225 for powering the tail rotor and anti-torque system 209 (FIGS. 2A and 2B). Each of the gears 922a and 922b is a compound gear that, at one end, includes spiral bevel gears 924a and 924b, respectively, and, at the other end, transmits power to the gear 920. The spiral bevel gears 924a and 924b transmit power to the gears 926a and 926b, respectively. In some examples, other gears are coupled to one or more of the spiral bevel gears 924a and 924b to transmit power to an auxiliary system such as a lubrication system pump, a blower gearbox, a generator, and/or a hydraulic pump. The gear 920 is coupled to a gear shaft that transmits power to the gears 928, which is planetary gear system for rotating the mast 251. The mast 251 transmits power to the rotor system 203 (FIGS. 2A and 2B).

The housing 902 of the main rotor gearbox 213 is separated into multiple compartments that house different components and are lubricated by a lubrication system that includes multiple lubrication subsystems. The main rotor gearbox 213 includes barriers 912 and 914, which form compartments 904, 906, and 908. Seals 916 and 918 seal a perimeter of the barriers 912 and 914, respectively. A portion of the mast 251 and bearings 934 and 936 are located in the compartment 904. A drip pan 917 is located proximate the bearing 934 and can capture liquids, such a lubricant from the mast and/or the bearings 934 and 936. The gears 928 are located in the compartment 906. The gear train 930 is located in the compartment 908.

Each of the barriers 912 and 914 is made of a rigid, material such as metal, a composite material (e.g., composite laminate material or a reinforced polymer). The barrier 912 extends between an inner face of the housing 902 and the gear shaft of the gears 928 and lies between the compartments 904 and 906. The seal 916 seals an edge of the barrier 912 proximate the mast 251. The barrier 912 can be attached to and/or sealed at an edge proximate the inner face of the housing 902. The barrier 912 and/or the seal 916 can prevent lubricant from passing between the compartments 904 and 906. The barrier 914 extends between an inner face of the housing 902 and the gear shaft of the gear 920 and lies between the compartments 906 and 908. The seal 918 seals an edge of the barrier 914 proximate the gear shaft of the gear 920. The barrier 914 can be attached to and/or sealed at an edge proximate the inner face of the housing 902. The barrier 914 and/or the seal 918 can prevent lubricant from passing between the compartments 904 and 906. In some examples, one or more of the barriers 912 and 914 is a sump for collecting, draining and/or recycling lubricant from one or more adjacent compartments.

Figure 9C:
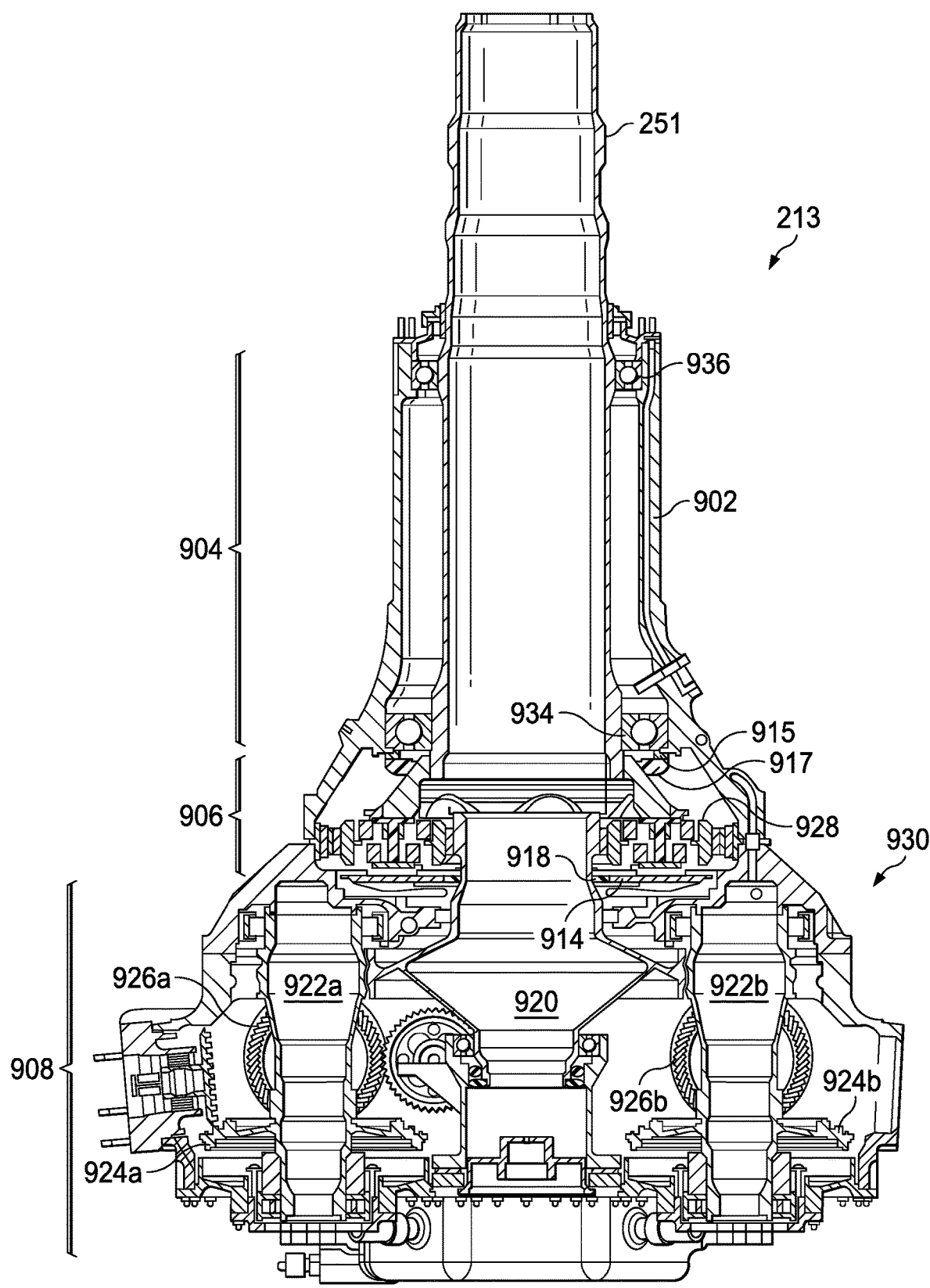

FIG. 9C illustrates the main rotor gearbox 213 of the drive system 233, in accordance with some embodiments, as an alternative to that illustrated in FIG. 9A. The description of the main rotor gearbox 213 of the drive system 233 is not repeated here only for the sake of brevity. A difference between the FIG. 9A and the FIG. 9C is that FIG. 9A includes a barrier 912 while the FIG. 9C lacks the barrier 912. Instead, the system of FIG. 9C utilizes a seal 915 to seal between the housing 902 and the drip pan 917 to segregate the compartments 904 and 906 from one another. This alternative not only can inhibit lubricant from passing between the compartments 904 and 906 but also can reduce the number of parts and/or weight of the system components relative to the FIG. 9A.

Figure 10:
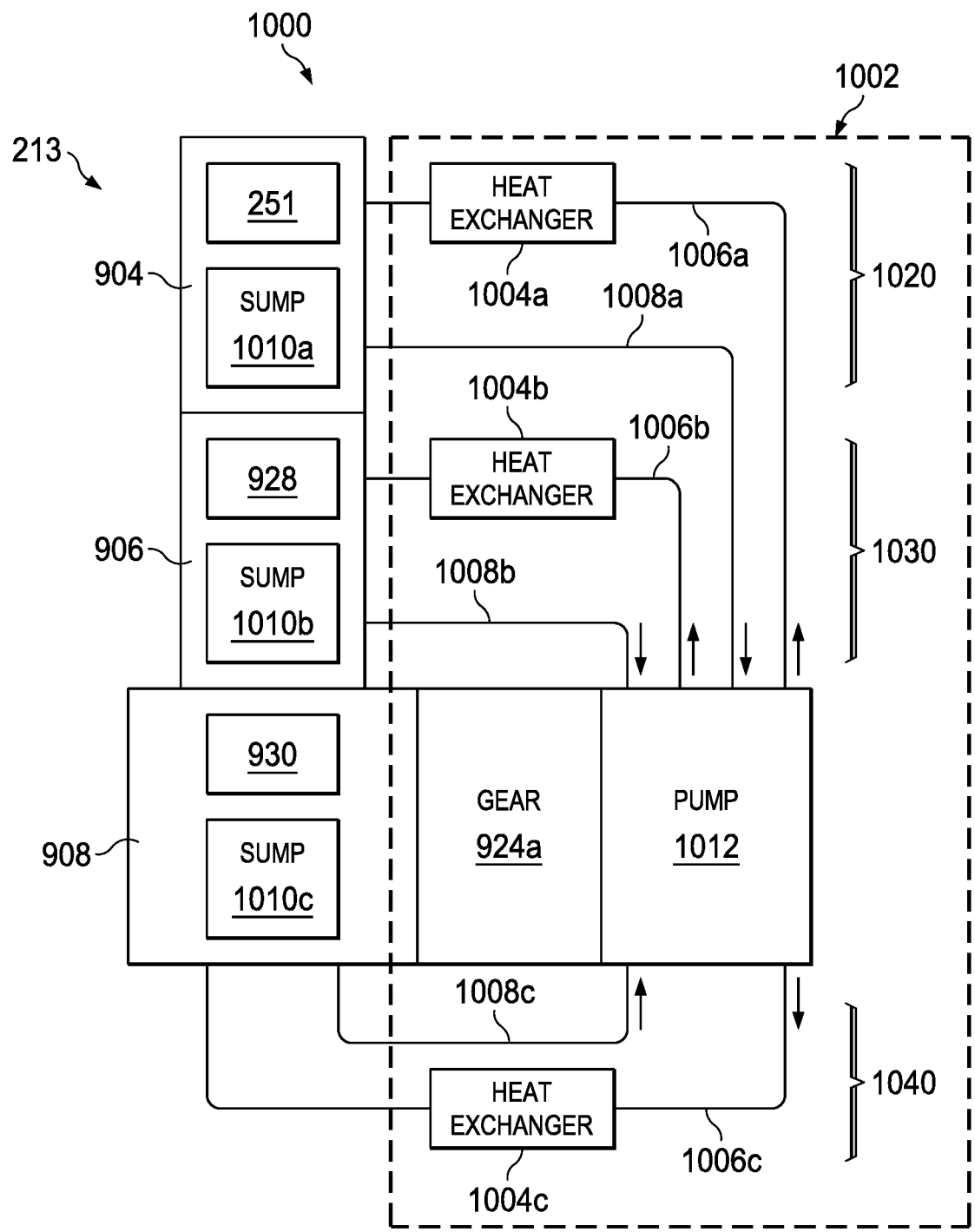
FIGS. 10, 11, and 13 show schematic views of various lubrication arrangements of a drive system, in accordance with some embodiments of the present disclosure.

FIG. 10 shows a schematic view of a lubrication arrangement of the main rotor gearbox 213 of the drive system 233, in accordance with some embodiments of the present disclosure. The system 1000 includes the main rotor gearbox 213, which is separated into the compartments 904, 906, and 908 as described with respect to FIGS. 9A and 9B. At least a portion of the mast 251 is located in the compartment 904. The gears 928 are located in the compartment 906. The gear train 930 is located in the compartment 908. The compartments 904, 906, and 908 includes sumps 1010a, 1010b, and 1010c, respectively.

The main rotor gearbox 213 includes a lubrication system 1002, which includes spiral bevel gear 924a, a pump 1012, and lubrication subsystems 1020, 1030, and 1040. The spiral bevel gear 924a provides power to the pump 1012, which in turn, pumps lubricant separately to each of the lubrication subsystems 1020, 1030, and 1040. The lubrication subsystems 1020, 1030, and 1040 lubricate drive system components in the compartments 904, 906, and 908, respectively. The lubrication subsystem 1020 lubricates the mast 251 and/or associated bearings 936 and 934 (FIG. 9A) in the compartment 904. The lubrication subsystem 1030 lubricates the gears 928 in the compartment 906. The lubrication subsystem 1040 lubricates the gear train 930 in the compartment 908. Each of the lubrication subsystems 1020, 1030, and 1040 includes a supply line (e.g., 1006a, 1006b, and 1006c, respectively), a heat exchanger (e.g., 1004a, 1004b, and 1004c, respectively), and a return line (e.g., 1008a, 1008b, and 1008c, respectively). Each of the lubrication subsystems 1020, 1030, and 1040 and sumps 1010a,

1010b, and 1010c can operate in the manner as described with respect to the lubrication subsystems 620, 630, 640, and/or 650 and the sumps 612a, 612b, 612c, and 612d of FIG. 6; the description of these components is not repeated here only for the sake of brevity. Each of the lubrication subsystems 1020, 1030, and 1040 is, at least in part, independent of others of the lubrication subsystems. For example, each of the subsystems includes independent supply lines, return lines, and heat exchangers. Advantageously, some of the lubrication subsystems 1020, 1030, and 1040 can continue to lubricate its corresponding compartment in the main rotor gearbox 213 even when one or more of them fails. However, if the pump 1012 fails all of the lubrication subsystems 1020, 1030, and 1040 could potentially malfunction.

Figure 11:
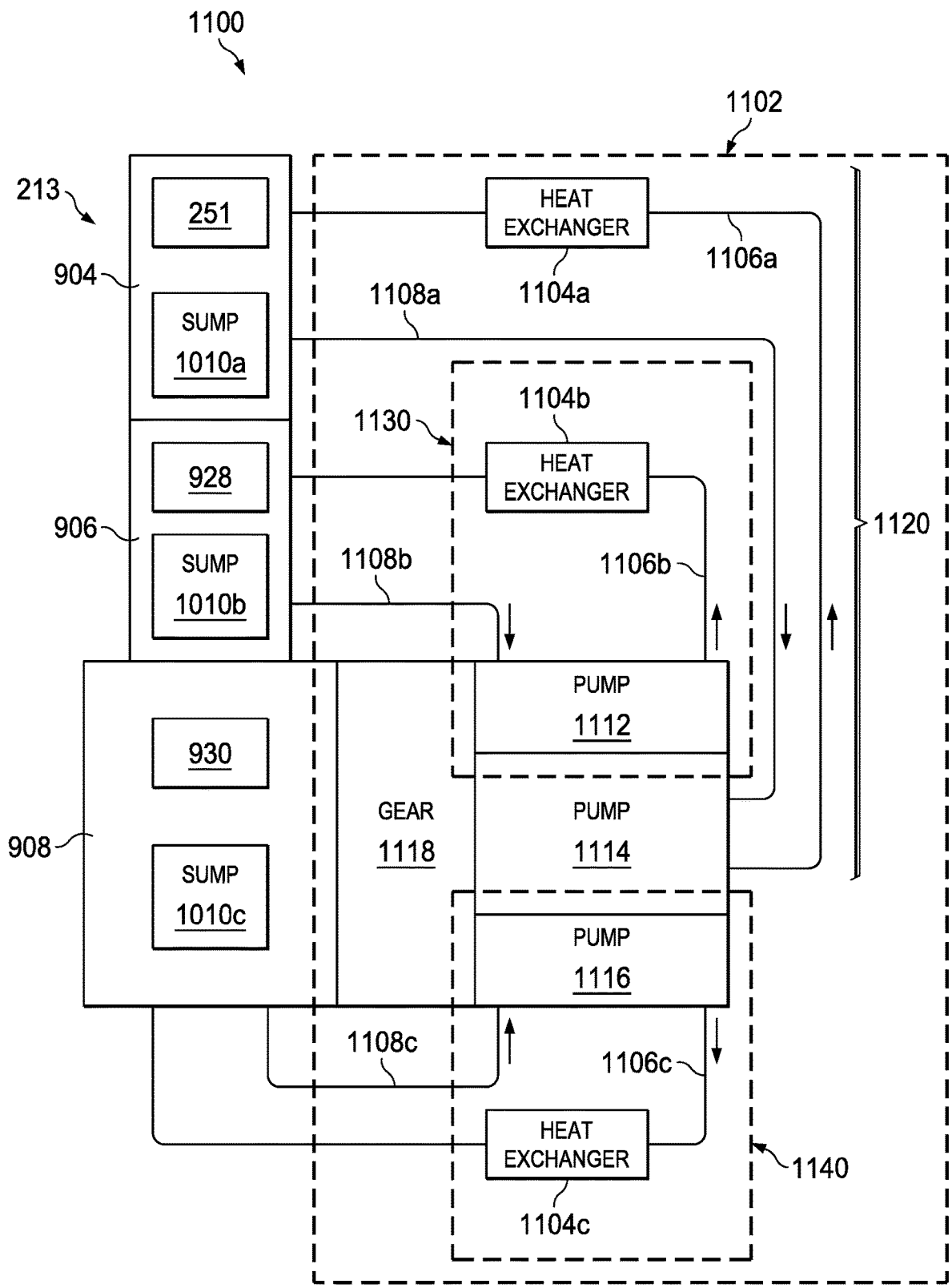
Figure 12:
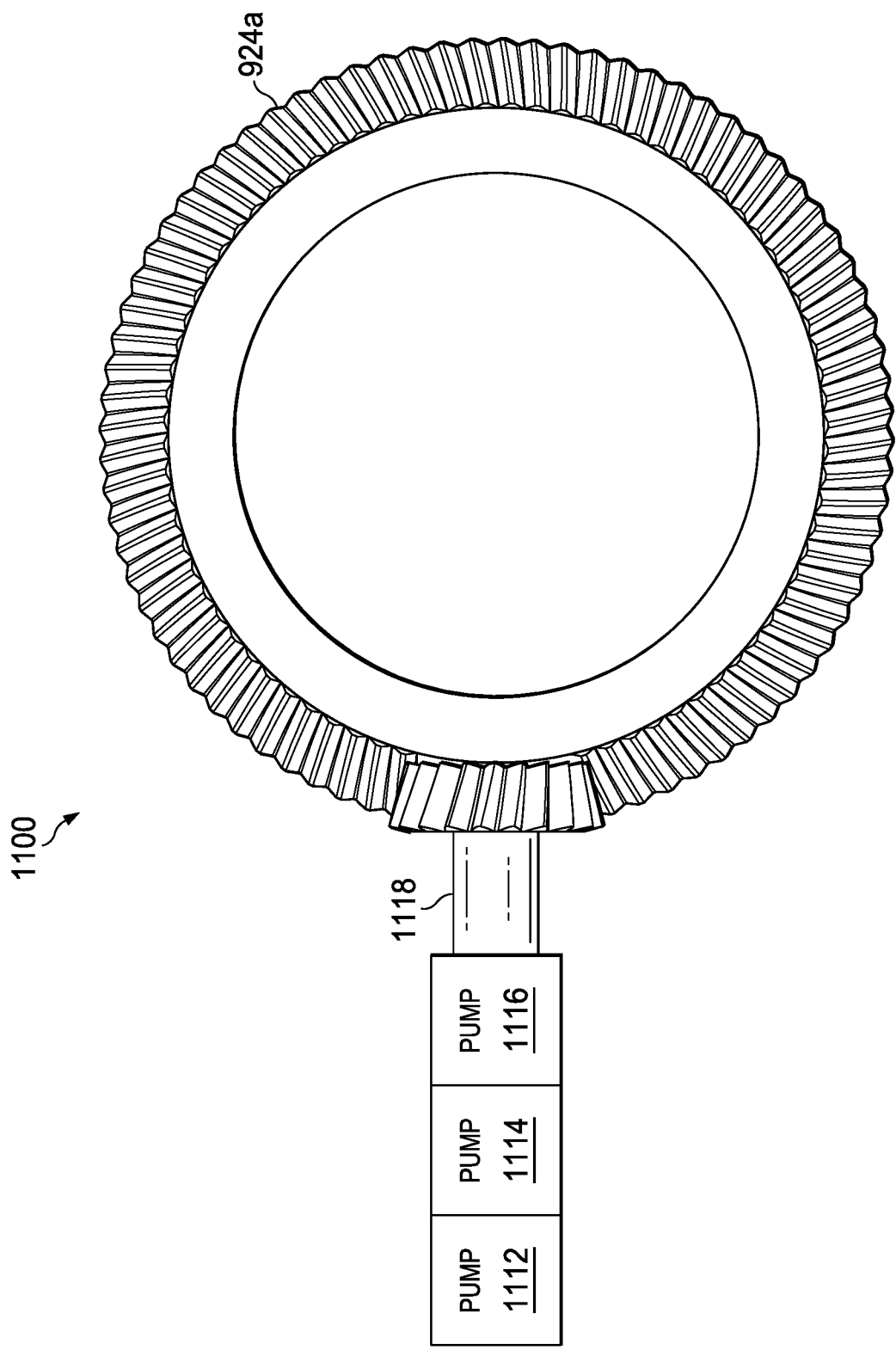
FIGS. 12 and 14 illustrate various pump and gear arrangements in accordance with some embodiments of the present disclosure.

FIGS. 11 and 12 show various views of another lubrication arrangement of the main rotor gearbox 213 the drive system 233. FIG. 11 is a schematic view of the lubrication arrangement; FIG. 12 illustrates pump and gear arrangements for the lubrication arrangement of FIG. 11, in accordance with some embodiments of the present disclosure. The system 1100 includes the main rotor gearbox 213, which is separated into the compartments 904, 906, and 908. Details of the main rotor gearbox 213 (e.g., sumps 612a, 612b, 612c, and 612d and drive system components 251, 928, and 930) are described with respect to FIG. 10; the description is not repeated here only for the sake of brevity.

The main rotor gearbox 213 includes a lubrication system 1102, which includes a gear 1118, and lubrication subsystems 1120, 1130, and 1140. The lubrication subsystems 1120, 1130, and 1140 lubricate drive system components in the compartments 904, 906, and 908, respectively. Each of the lubrication subsystems 1120, 1130, and 1140 include a supply line (e.g., 1106a, 1106b, and 1106c, respectively), a heat exchanger (e.g., 1104a, 1104b, and 1104c, respectively), and a return line (e.g., 1108a, 1108b, and 1108c, respectively). The supply lines, heat exchanges, and return line can generally operate as described with respect to FIG. 10; the description of these components is not repeated here only for the sake of brevity. One difference is that in the FIG. 11, the supply lines and return lines for the lubrication subsystems are coupled to different pumps. In FIG. 11, the lubrication subsystems 1120, 1130, and 1140 also includes pumps 1114, 1112, and 1116, respectively. The gear 1118 provides power to pumps 1112, 1114, and 1116. For example, FIG. 12 illustrates the spiral bevel gear 924a transmitting power to the gear 1118. The gear 1118 transmits the power to each of the pumps 1112, 1114, and 1116, which are coupled in parallel to the gear 1118. The pumps 1112, 1114, and 1116 pump lubricant to the lubrication subsystems 1130, 1120, and 1140, respectively.

A difference between the lubrication system 1102 of FIG. 11 and the lubrication system 1002 of FIG. 10 is that the lubrication system 1102 includes multiple pumps (e.g., pumps 1112, 1114, and 1116) while the lubrication system 1002 of FIG. 10 includes a single pump (e.g., pump 1012). The additional pumps provide an additional layer of independence between the lubrication subsystems 1120, 1130, and 1140 and address a challenge associated with a single pump failure causing failure of an entire lubrication system. The lubrication subsystems 1120, 1130, and 1140 includes independent pumps, supply lines, return lines, and heat exchangers. Advantageously, some of the lubrication subsystems 1120, 1130, and 1140 can continue to lubricate its corresponding compartment in the main rotor gearbox 213 even when one or more of the lubrication subsystems fails based on a pump failure. For example, the lubrication subsystems 1120 and 1130 can continue to lubricate its corresponding compartment in the main rotor gearbox 213 even when the pump 1116 fails and causes a failure such as LOL in the lubrication subsystem 1140. Failure of the gear 1118, however, may cause all of the pumps 1112, 1114, and 1116 to potentially malfunction and cause a failure of the lubrication subsystems 1020, 1030, and 1040.

Figure 13:
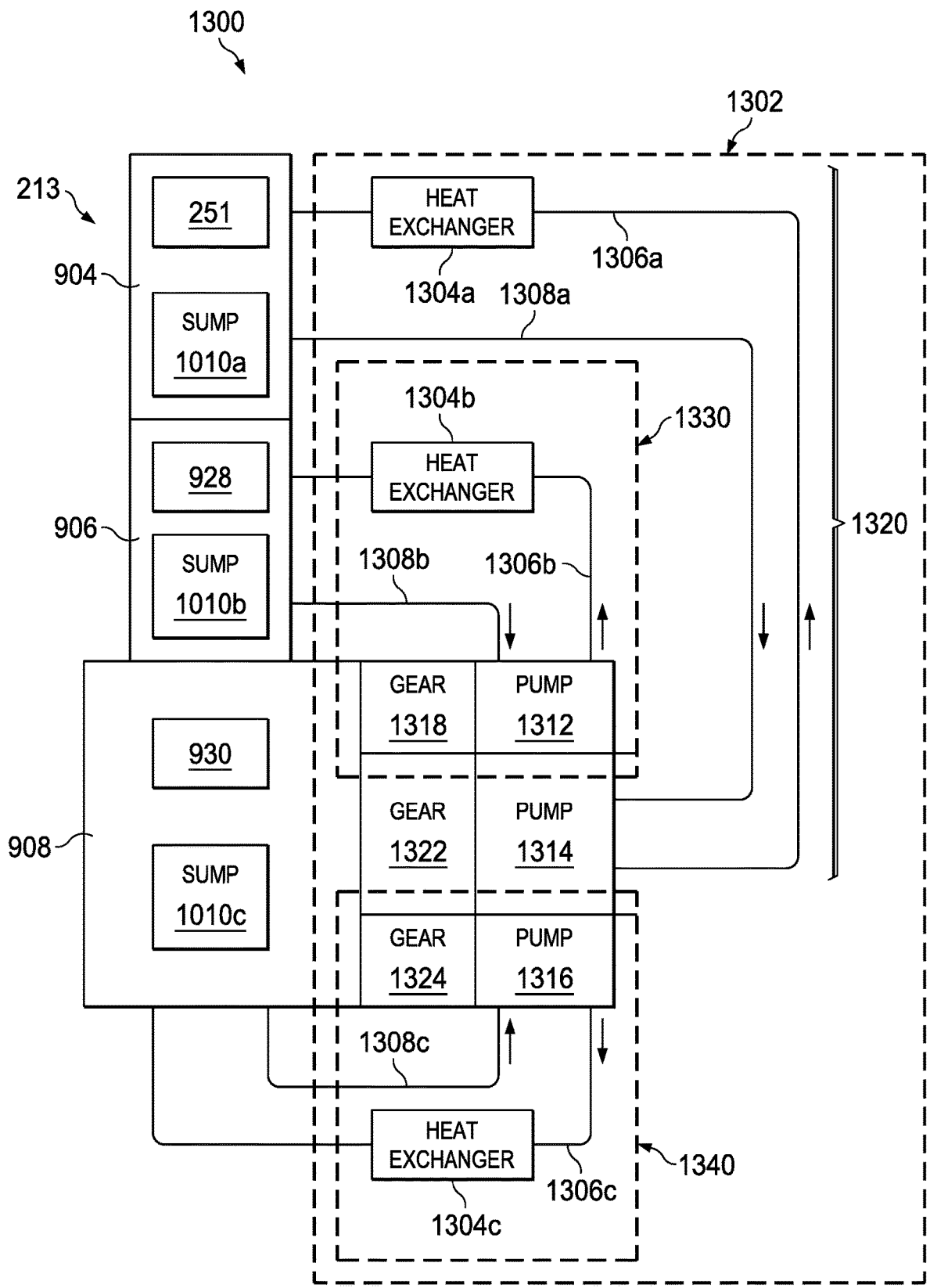
Figure 14:
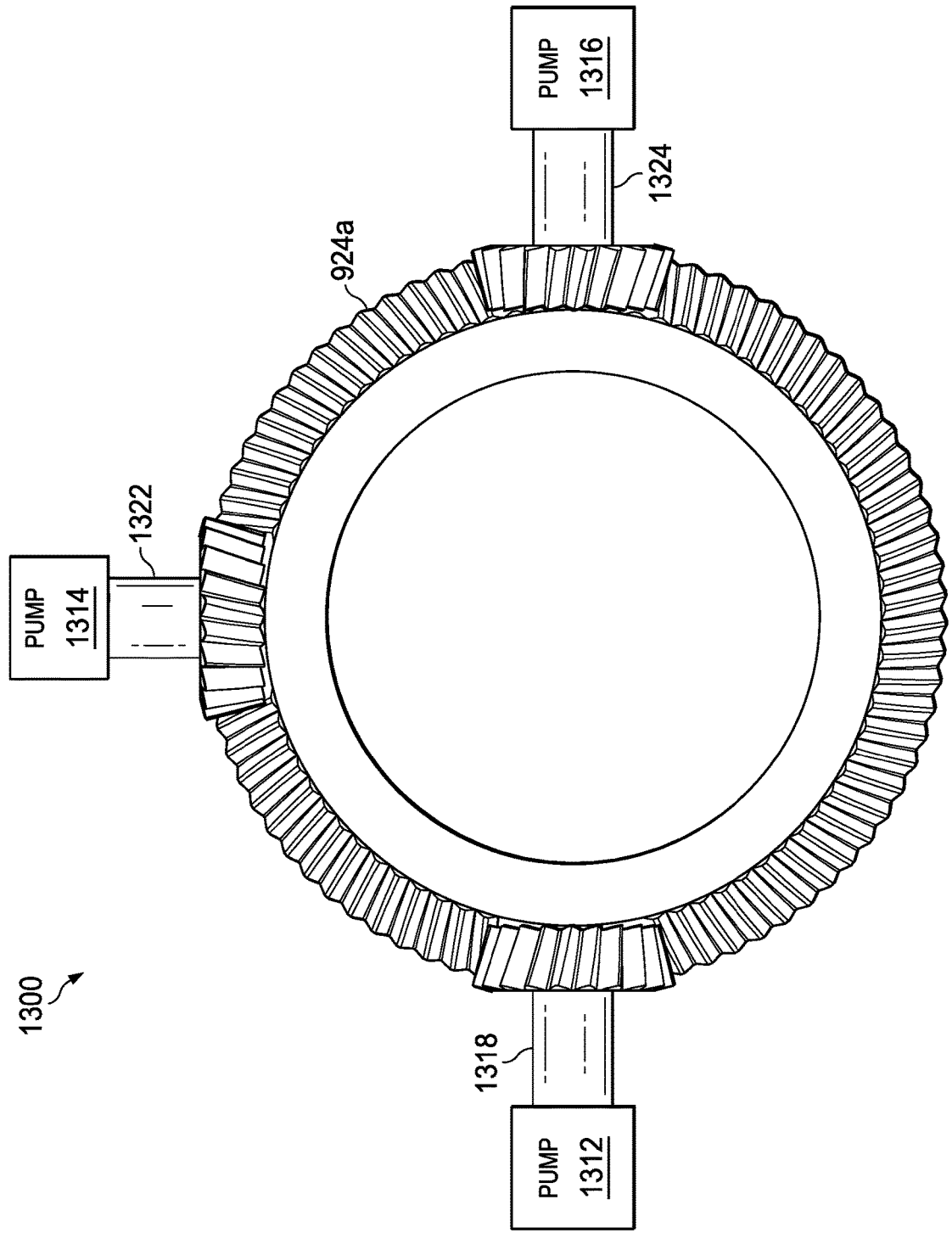

FIGS. 13 and 14 show various views of yet another lubrication arrangement of the main rotor gearbox 213 of the drive system 233. FIG. 13 is a schematic view of the lubrication arrangement; FIG. 14 illustrates pump and gear arrangements for the lubrication arrangement of FIG. 11 in accordance with some embodiments of the present disclosure. The system 1300 includes the main rotor gearbox 213, which is separated into the compartments 904, 906, and 908. Details of the main rotor gearbox 213 are described with respect to FIG. 10; the description is not repeated here only for the sake of brevity.

The main rotor gearbox 213 includes a lubrication system 1302, which includes lubrication subsystems 1320, 1330, and 1340. The lubrication subsystems 1120, 1130, and 1140 include a supply line (e.g., 1306a, 1306b, and 1306c, respectively), a heat exchanger (e.g., 1304a, 1304b, and 1304c, respectively), and a return line (e.g., 1308a, 1308b, and 1308c, respectively), gears (e.g., 1322, 1318, and 1324, respectively), and pumps (e.g., 1314, 1312, and 1316, respectively). The pumps, supply lines, heat exchanges, and return line can generally operate as described with respect to FIG. 11; the description of these components is not repeated here only for the sake of brevity. One difference is that in the FIG. 13, the pumps of the lubrication subsystems are coupled to different gears.

The gears 1318, 1322, and 1324 provides power to the pumps 1312, 1314, and 1316, respectively. For example, FIG. 14 illustrates the spiral bevel gear 924a transmitting power to the gears 1318, 1322, and 1324. The gear 1318 transmits the power to the pump 1312. The gear 1322 transmits the power to the pump 1314. The gear 1324 transmits the power to the pump 1316. The pumps 1312, 1314, and 1316 pump lubricant to the lubrication subsystems 1330, 1320, and 1340, respectively. The lubrication subsystems 1320, 1330, and 1340 lubricate drive system components in the compartments 904, 906, and 908, respectively.

A difference between the lubrication system 1302 of FIG. 13 and the lubrication system 1102 of FIG. 11 is that the lubrication system 1302 includes multiple gear paths (e.g., through the gears 1318, 1322, and 1324) while the lubrication system 1102 of FIG. 11 includes a single gear path (e.g., through gears 1118 and 924a). These additional gears provide an additional layer of independence between the lubrication subsystems 1320, 1330, and 1340 and address a challenge associated with failure of a single gear and/or gear path causing failure of an entire lubrication system. Each of the lubrication subsystems 1320, 1330, and 1340 includes independent gears, pumps, supply lines, return lines, and heat exchangers. Advantageously, some of the lubrication subsystems 1320, 1330, and 1340 can continue to lubricate its corresponding compartment in the main rotor gearbox 213 even when one or more of them fails based on a gear failure. For example, the lubrication subsystems 1330 and 1340 can continue to lubricate its corresponding compartment in the main rotor gearbox 213 even when the gear 1322 fails and causes a failure such as LOL in the lubrication subsystem 1320.

In some embodiments, one or more of the gears 1318, 1322, and 1324 receive power from the spiral bevel gear 924b instead of the spiral bevel gear 924a. The use of a separate spiral bevel gear to provide power to different ones of the gears 1318, 1322, and 1324 (and their respective pumps 1312, 1314, and 1316) provides a further level of independence between the lubrication subsystems 1320, 1330, and 1340. In such embodiments, failure of one of the spiral bevel gears 924a or 942b would not cause failure of all of the lubrication subsystems 1320, 1330, and 1340. Advantageously, some of the lubrication subsystems 1320, 1330, and 1340 can continue to lubricate its corresponding compartment in the main rotor gearbox 213 even when either one of the spiral bevel gears 924a and 942b fails.

Figure 15:
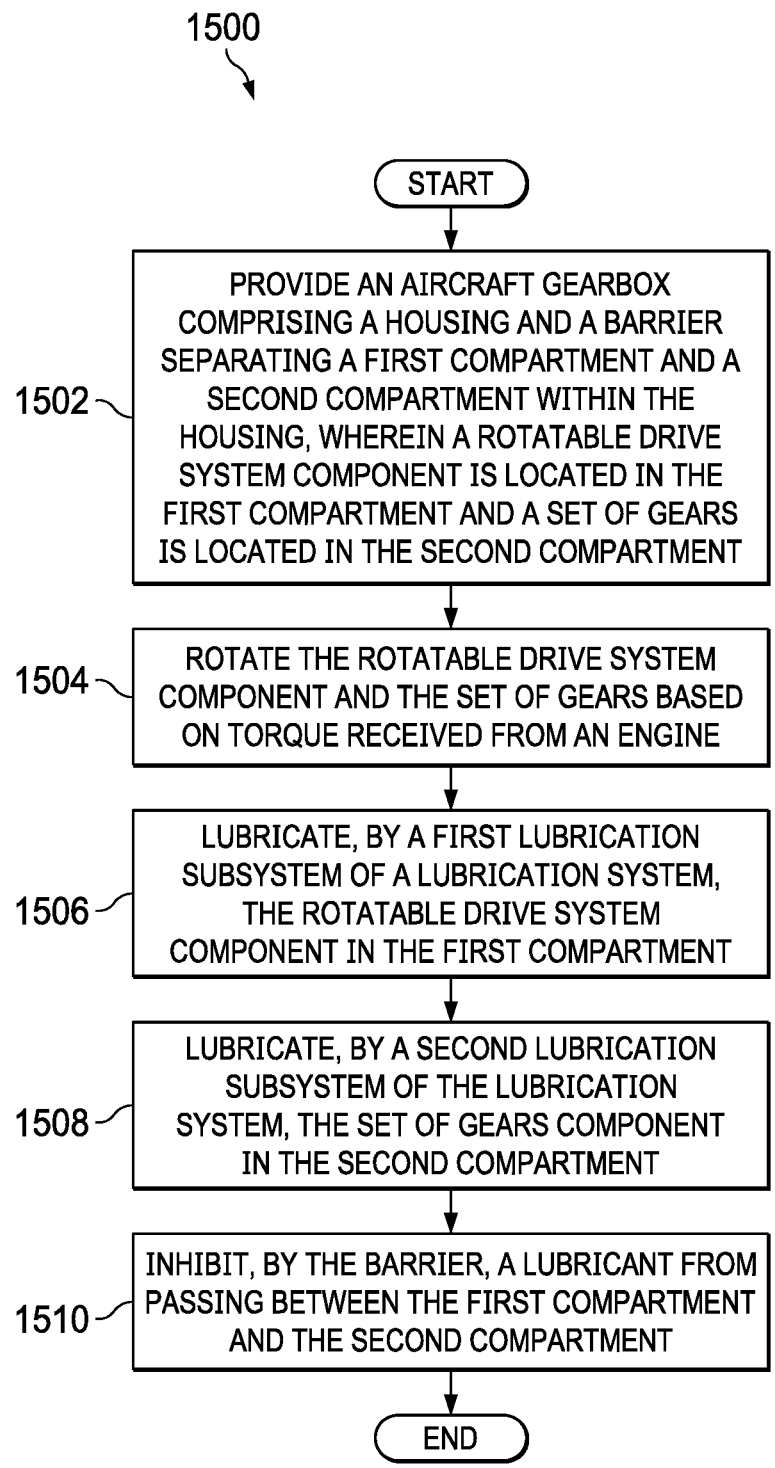
FIG. 15 illustrates a method in accordance with some embodiments of the present disclosure.

FIG. 15 illustrates a method 1500 according to some embodiments of the present disclosure. The method 1500 may begin at 1502 by providing an aircraft gearbox comprising a housing and a barrier separating a first compartment and a second compartment within the housing. A rotatable drive system component is located in the first compartment and a set of gears is located in the second compartment. The method 1500 uses a first lubrication system and a second lubrication system that are, at least in part, independent of one another. At 1504, the rotatable drive system component and the set of gears are rotated based on torque received from an engine. The method 1500 utilizes the lubrication system to independently lubricate the rotatable drive system component and the set of gears. At 1506, the first lubrication system lubricates the rotatable drive system component in the first compartment. At 1508, the second lubrication system lubricates the set of gears in the second compartment. The method 1500 may terminate at 1510 when the barrier inhibits a lubricant from passing between the first compartment and the second compartment. In some embodiments, one or more portions of the method 1500 may repeat, e.g., in a loop.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order. As another example, some embodiments of the present disclosure have been described with respect to inhibiting (and/or preventing) lubricant from passing between compartments within a drive system. However, it will be appreciated by those of skill in the art that embodiments of the present disclosure are not limited to lubricants and are equally applicable to any liquid that may be utilized in such a drive system. In addition, it will be appreciated by those of skill in the art that embodiments of the present disclosure are not limited to drive systems and are equally applicable to any system of an aircraft, or another vehicle, that relies on liquids for operation.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft gearbox comprising:
    a housing;
    a barrier extending inward from an inner face of the housing and completely isolating a first sealed compartment from a sealed second compartment within the housing;
    a rotatable drive system component located in the first sealed compartment;
    a set of gears located in the second sealed compartment, wherein each of the rotatable drive system component and the set of gears are operable to rotate based on torque received from an engine;
    a lubrication system comprising
        a first lubrication system operable to lubricate the rotatable drive system component in the first sealed compartment; and
        a second lubrication system operable to lubricate the set of gears in the second sealed compartment, wherein the first lubrication system and the second lubrication system are, at least in part, independent from one another and the barrier inhibits lubricant from passing between the first sealed compartment and the second sealed compartment;
    wherein the first lubrication system is a non-pressurized lubrication system and the second lubrication system is a pressurized lubrication system having a minimum threshold operating pressure of 30 pounds per square inch (PSI).

2. The aircraft gearbox of claim 1, wherein the first lubrication system and the second lubrication system operate in parallel with one another.

3. The aircraft gearbox of claim 1, wherein operating pressure of the second lubrication system is 50 PSI.

4. An aircraft comprising:
    an engine;
    a set of gears operable to rotate based on torque received from the engine;
    a driveshaft assembly receiving torque from the set of gears; and
    a gearbox comprising:
        a housing;
        a barrier extending inward from an inner face of the housing and completely isolating a first sealed compartment from a sealed second compartment within the housing, wherein the first sealed compartment encloses a portion of the driveshaft assembly and the set of gears is located in the second sealed compartment;

a lubrication system comprising:

a first lubrication system operable to lubricate the portion of the driveshaft assembly in the first sealed compartment; and a second lubrication system operable to lubricate the set of gears in the second sealed compartment, wherein the first lubrication system and the second lubrication system are, at least in part, independent from one another and the barrier inhibits lubricant from passing between the first sealed compartment and the second sealed compartment;

wherein the first lubrication system is a non-pressurized lubrication system and the second lubrication system is a pressurized lubrication system having a minimum threshold operating pressure of 30 pounds per square inch (PSI).

5. The aircraft of claim 4, wherein the first lubrication system and the second lubrication system operate in parallel with one another.

6. The aircraft of claim 4, wherein operating pressure of the second lubrication system is 50 PSI.

7. A method comprising:

providing an aircraft gearbox comprising a housing and a barrier extending inward from an inner face of the housing and completely isolating a first sealed compartment from a sealed second compartment within the housing, wherein a rotatable drive system sealed component is located in the first sealed compartment and a set of gears is located in the second sealed compartment;

rotating the rotatable drive system component and the set of gears based on torque received from an engine;

independently lubricating the rotatable drive system component and the set of gears with a lubrication system comprising a first lubrication system and a second lubrication system, wherein the independently lubricating comprises:

lubricating, by the first lubrication system, the rotatable drive system component in the first sealed compartment;

lubricating, by the second lubrication system, the set of gears in the second sealed compartment; and inhibiting, by the barrier, a lubricant from passing between the first sealed compartment and the second sealed compartment;

wherein the first lubrication system is a non-pressurized lubrication system and the second lubrication system is a pressurized lubrication system having a minimum threshold operating pressure of 30 pounds per square inch (PSI).

8. The method of claim 7, wherein the first lubrication system and the second lubrication system operate in parallel with one another.

9. The method of claim 7, wherein operating pressure of the second lubrication system is 50 PSI.

* * * * *